US010751730B2

(12) United States Patent
Meinig et al.

(10) Patent No.: US 10,751,730 B2
(45) Date of Patent: Aug. 25, 2020

(54) PARTICLE SEPARATING SYSTEM

(71) Applicant: Schwäbische Hüttenwerke Automotive GmbH, Aalen-Wasseralfingen (DE)

(72) Inventors: Uwe Meinig, Bad Saulgau (DE); Jürgen Bohner, Bad Waldsee (DE)

(73) Assignee: Schwäbische Hüttenwerke Automotive GmbH, Aalen-Wasseralfingen (DE)

( * ) Notice: Subject to any disclaimer, the term of this patent is extended or adjusted under 35 U.S.C. 154(b) by 509 days.

(21) Appl. No.: 15/672,770

(22) Filed: Aug. 9, 2017

(65) Prior Publication Data

US 2018/0043374 A1 Feb. 15, 2018

(30) Foreign Application Priority Data

Aug. 10, 2016 (DE) .................. 10 2016 214 914

(51) Int. Cl.
*B04B 5/00* (2006.01)
*B01D 35/153* (2006.01)
(Continued)

(52) U.S. Cl.
CPC .............. *B04B 5/005* (2013.01); *B01D 29/21* (2013.01); *B01D 29/902* (2013.01);
(Continued)

(58) Field of Classification Search
CPC ...... B04B 5/005; B01D 29/21; B01D 29/908; B01D 29/902; B01D 36/045;
(Continued)

(56) References Cited

U.S. PATENT DOCUMENTS 6,484,680 B2   11/2002   Lunsford
8,061,317 B2   11/2011   Bohner et al.
(Continued)

FOREIGN PATENT DOCUMENTS

CN   103032127 A   4/2013
CN   103573319 A   2/2014
(Continued)

OTHER PUBLICATIONS

German Search Report issued in DE 10 2016 214 914.8 dated Mar. 21, 2017, 11 pages.
(Continued)

*Primary Examiner* — Xiao En Mo
(74) *Attorney, Agent, or Firm* — RatnerPrestia

(57) ABSTRACT

A particle separating system for supplying a cam shaft phase adjuster with cleaned lubricating oil. The phase adjuster includes a stator, a rotor connectable to a cam shaft, and a control valve for hydraulically adjusting the rotational angular position of the rotor relative to the stator. The particle separating system includes an oil separator arranged in the flow of the lubricating oil, upstream of an oil gallery of an engine supplied with the lubricating oil, exhibiting a separation efficiency of at least 50% for particles having a size $P1$ and a separation efficiency of at least 90% at a size $P2>P1$; a particle separator arranged downstream of the oil separator and upstream of the phase adjuster or control valve, to clean the lubricating oil for the phase adjuster. The particle separator exhibits a separation efficiency of 50% at a size $P3$, where $P1<P3<100$ μm.

19 Claims, 11 Drawing Sheets

(51) Int. Cl.
*B01D 29/90* (2006.01)
*B01D 35/06* (2006.01)
*B01D 29/21* (2006.01)
*F01L 1/344* (2006.01)
*B01D 36/04* (2006.01)
B01D 21/26 (2006.01)
F01L 1/047 (2006.01)

(52) U.S. Cl.
CPC .......... *B01D 29/908* (2013.01); *B01D 35/06* (2013.01); *B01D 35/153* (2013.01); *B01D 36/045* (2013.01); *F01L 1/3442* (2013.01); B01D 21/265 (2013.01); B01D 2201/02 (2013.01); B01D 2201/0461 (2013.01); B01D 2201/188 (2013.01); F01L 1/047 (2013.01); F01L 2001/3443 (2013.01); F01L 2001/3444 (2013.01); F01L 2001/34433 (2013.01); F01L 2001/34436 (2013.01)

(58) Field of Classification Search
CPC .. B01D 35/153; B01D 35/06; B01D 2201/02; B01D 2201/188; B01D 21/265; F01L 1/3442; F01L 2001/34436; F01L 2001/3443; F01L 2001/3444; F01L 1/047; F01L 2001/34433
See application file for complete search history.

(56) References Cited

U.S. PATENT DOCUMENTS

| | | | |
|---|---|---|---|
| 8,910,602 B2 | 12/2014 | Bohner et al. | |
| 9,021,997 B2 | 5/2015 | Welte et al. | |
| 9,200,546 B2 | 12/2015 | Meinig et al. | |
| 2001/0010295 A1* | 8/2001 | Yamada | B01D 35/157 210/110 |
| 2002/0124819 A1* | 9/2002 | Lunsford | F01L 1/34 123/90.15 |
| 2010/0108590 A1* | 5/2010 | Curt | B01D 29/21 210/232 |
| 2013/0134044 A1* | 5/2013 | Bause | B01D 35/06 204/562 |
| 2014/0219847 A1* | 8/2014 | Watanabe | F04C 2/3442 418/24 |
| 2015/0233481 A1 | 8/2015 | Shimura | |
| 2016/0201822 A1* | 7/2016 | Takada | F01L 1/3442 251/129.15 |

FOREIGN PATENT DOCUMENTS

| | | |
|---|---|---|
| CN | 104847433 A | 8/2015 |
| DE | 10209197 A1 | 12/2002 |
| DE | 102006033555 A1 | 1/2008 |
| DE | 102007020431 B4 | 7/2010 |
| EP | 10107035 A1 | 8/2002 |
| EP | 2578818 A | 4/2013 |
| EP | 2578818 B1 | 9/2015 |
| JP | 07145713 A | 6/1995 |
| JP | 2005299674 A | 10/2005 |

OTHER PUBLICATIONS

Extended European Search Report for European Application No. 17185120.7, dated Feb. 5, 2018 with partial translation, 11 pages.
Chinese Office Action issued in Chinese Application No. 201710682080. 7, dated Mar. 27, 2019 with translation, 11 pages.

* cited by examiner

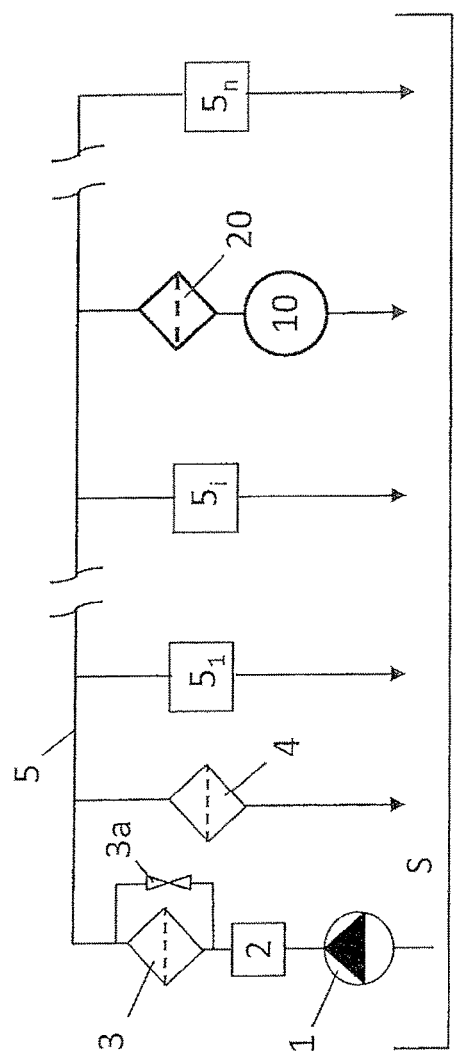
Figure 1
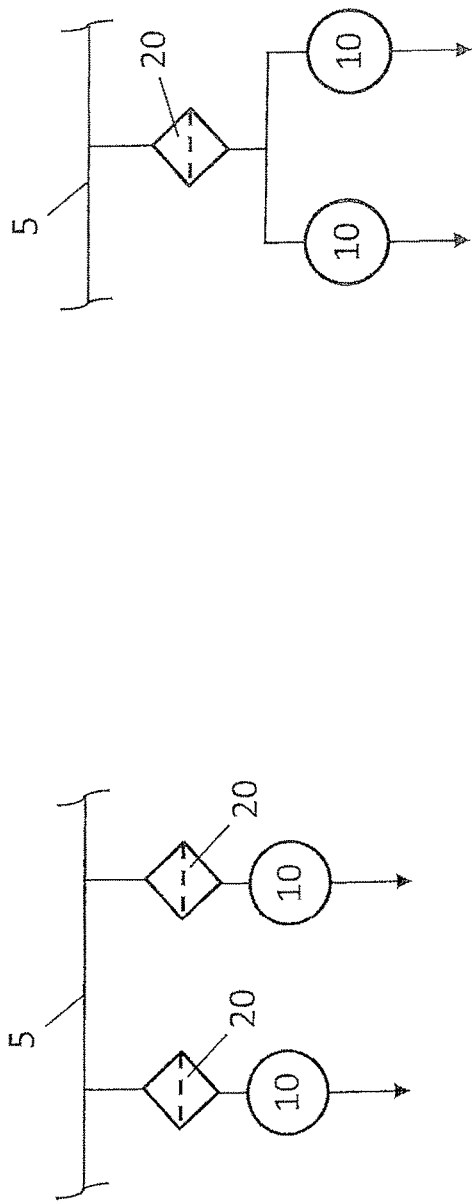
Figure 2
Figure 3

PARTICLE SEPARATING SYSTEM

CROSS REFERENCE TO RELATED APPLICATIONS

This application claims priority to German Patent Application No. 10 2016 214 914.8, filed Aug. 10, 2016, the contents of such application being incorporated by reference herein.

FIELD OF THE INVENTION

The invention relates to a particle separating system for supplying a hydraulic cam shaft phase adjuster with engine lubricating oil as a pressure medium. The particle separating system is integrated into a lubricating oil cycle of an internal combustion engine or is provided for being incorporated into the lubricating oil cycle.

BACKGROUND OF THE INVENTION

Hydraulic cam shaft phase adjusters are typically supplied with engine lubricating oil which serves as a pressure medium in the phase adjuster for adjusting the phase position of a cam shaft relative to a driving crankshaft of an internal combustion engine. The phase adjuster adjoins the lubricating oil cycle of the engine and is therefore supplied with the lubricating oil via the so-called main oil separator of the lubricating oil cycle. Despite cleaning in the main oil separator, it is common to arrange a filter screen in the phase adjuster in order above all to keep original dirt away from the phase adjuster.

EP 2 578 818 B1, which incorporated by reference. discloses arranging a filter screen in the region of the pressure port of a control valve of the phase adjuster. Arranging filter sleeves around the working ports of the control valve is also known. Since the installation spaces are small and there is simultaneously a requirement for as little pressure loss as possible, but also because of a requirement for the mechanical stability of the filter screen to be sufficient, filter media which are used include metal fabrics, plastic fabrics or thin perforated (metal) sheets. The mean mesh size or aperture width of the screen apertures is significantly above 100 μm and typically around 200 μm and more. Despite cleaning in the main oil separator and in the phase adjuster, malfunctions in the phase adjuster and frictional wear on the parts of the phase adjuster which can be moved relative to each other are a problem.

Through systematic experiments using different dirt mixtures, so-called misuse experiments, the inventors have discovered that even solid particles having particle dimensions of less than 100 μm cause frictional wear, above all on the hydraulic functional components of the control valves and on the bearing of the magnetic anchors of the electromagnetic valve actuators, and also directly cause malfunctions in these components of phase adjusters. There is for example the danger of such particles leading to a blockage of the valve piston in a control valve of a phase adjuster. Sand and corundum particles have also in particular proven problematic. During the production of engines, such particles can enter the oil channels of the cylinder crankcases as casting sand and blasting material and, despite the lubricating oil in the main oil separator being cleaned and despite the filter screens additionally arranged in the phase adjusters, have a certain statistical likelihood of leading to malfunctions in the phase adjuster.

SUMMARY OF THE INVENTION

An aspect of the invention provides a particle separating system, for solid particles contained in the engine lubricating oil, which effectively separates particles which can damage a cam shaft phase adjuster, in order to reduce the incidence of malfunctions in the phase adjuster and in principle also to reduce the frictional wear on moving parts of the phase adjuster. Despite effectively protecting against the introduction of dirt particles and associated malfunctions, the particle separating system is intended to operate for a long period of time without the need for maintenance. For its application in motor vehicle manufacturing, the aim is for the particle separating system to operate for the service life of the internal combustion engine of the respective vehicle without the need for maintenance or at least only little maintenance and to effectively protect the one or more assigned cam shaft phase adjusters for the service life of the internal combustion engine. In commercial vehicle manufacturing in particular, this is a challenging aim. Where the particle separating system is employed in freight lorries, for example, operating durations of 15,000 to 30,000 and in some cases up to 50,000 hours will be required.

An aspect of the invention proceeds on the basis of a particle separating system for supplying a hydraulic cam shaft phase adjuster with engine lubricating oil as a pressure medium, comprising a main oil separator and additionally a particle separator which is arranged downstream of the main oil separator and upstream of the cam shaft phase adjuster, i.e. between the main oil separator and the cam shaft phase adjuster or a control valve of the phase adjuster, and optionally in part within the cam shaft phase adjuster. The main oil separator is the main oil separator of the lubricating oil cycle of the respective internal combustion engine. The main oil separator is accordingly arranged in the flow of the engine lubricating oil, upstream of a lubricating oil gallery of the internal combustion engine which is to be supplied with the engine lubricating oil, and thus serves to clean all the engine lubricating oil which can be fed to the internal combustion engine via the lubricating oil gallery. The terms "main flow oil separator" or "engine lubricating oil filter" are also common for such separators.

Where it is stated that the particle separator is arranged upstream of the cam shaft phase adjuster, this means that the particle separator is arranged upstream of the phase adjuster in terms of flow dynamics. The particle separator or a separating stage of the particle separator can thus be arranged in a stator of the phase adjuster. The lubricating oil flows through the particle separator provided in the stator or through the separating stage of a multi-stage particle separator, said separating stage being provided in the stator, before it reaches the pressure port of the control valve of the phase adjuster. The control valve is understood to be part of the phase adjuster. In such embodiments, the particle separator or a separating stage of a multi-stage particle separator is arranged upstream of the control valve, i.e. upstream of a pressure port of the control valve. The control valve is thus effectively protected, but the particle separator or the separating stage can still be realised independently of any installation limitations which the control valve would impose. The control valve, in particular a moving valve piston of the control valve, is a component of phase adjusters which is particularly critical with regard to the danger of blockage due to dirt particles.

The effectiveness of separators in general, and separators in an engine lubricating oil cycle in particular, in relation to separating solid particles can be described by one or more separation efficiencies or by one complete separation curve. Many different separators can be distinguished from each other by one or more separation efficiencies or by their complete separation curves. The separation efficiency is defined as the ratio of the quantity of the material to be isolated which is separated by the respective separator or separating system to the quantity of the material to be isolated which is introduced into the separator or separating system, wherein the material to be isolated in the present case is solid particles at or above a minimum particle size. The concentration of particles to be separated can equally be used instead of the quantity. If the introduced concentration is $c_0$ and the achieved concentration is $c_1$, then the separation efficiency $\eta$ is defined as $\eta = (c_0 - c_1)/c_0$.

Wherever a separation efficiency is mentioned in the following, this always refers to the separation efficiency as a function of an average particle diameter of the solid particles to be isolated. The average particle diameter is referred to in the following simply as the particle size. Thus, for example, the expression "separation efficiency of 50% at a particle size of 50 µm" means that the relevant separator separates 50% of the solid particles contained in the engine lubricating oil which exhibit a particle size of 50 µm, and allows 50% of the solid particles having a particle size of 50 µm to pass. The particle size of the particles, which in general are irregularly shaped, is determined from the known density and from the volume or mass—ascertained by measurement—of the solid particles, as a diameter of a sphere which is equivalent to the volume or mass of the particles. The particle size has an index of 3. The expression "particle size P of x µm" thus means that the particles having the particle size P have a volume or mass which is equivalent to the volume or mass of a sphere having the diameter x. In filtration technology, this separation efficiency is referred to as $\eta_3$.

The main oil separator exhibits a separation efficiency of 50% at a particle size P1, i.e. a separation efficiency of 50% for particles of the particle size P1, and a separation efficiency of at least 90% at a particle size P2, i.e. a separation efficiency of at least 90% for particles of the particle size P2, wherein the particle size P2 is larger than the particle size P1. The particle size P1 can for example be between 10 µm and 20 µm and in particular between 12 and 15 µm, wherein the lower and upper limits of the particle size are each inclusive. The particle size P2 can for example be between 30 µm and 50 µm, in particular between 30 and 40 µm, wherein the lower and the upper limits are again inclusive. The separation efficiencies can correspond to the separation efficiencies of the main oil separators which are common in motor vehicle manufacturing. The main oil separator can be a main flow oil separator which is common in motor vehicles.

In accordance with the invention, the particle separator which is arranged downstream of the main oil separator exhibits a separation efficiency of 50% ($\eta_{3,50}$) at a particle size P3 which is larger than P1 but smaller than 100 µm. In a diagram which shows separation efficiencies of the respective separator as a function of the particle size, the separation curve of the particle separator is therefore offset to the right on the X-axis, in the direction of increasing particle size, relative to the separation curve of the main oil separator.

In preferred embodiments, the particle separator in accordance with the invention which is arranged downstream of the main oil separator exhibits a separation efficiency of at most 50% up to the particle size P2, i.e. a separation efficiency of at most 50% for particles of the particle size P2 and smaller, and thus achieves the separation efficiency of 50% only at a particle size of P3>P2.

Because the particle separator is attuned in accordance with the invention in relation to the main oil separator, the solid particles which have been identified by the inventors as particularly damaging and/or acutely compromising to functionality and which have a particle size smaller than 100 µm but larger than P1 or, in preferred embodiments, larger than P2, are effectively separated. For particles in the upper size range of the separable spectrum, for example particles having particle sizes between 70 µm and 90 µm, the separation efficiency is over 50% in advantageous embodiments. The particle separator separates a majority of the particles identified by the inventors as critical, which the known filter screens cannot achieve. The particle separator cleans the engine lubricating oil of particles which should not actually have passed the main oil separator, which have bypassed the main oil separator, for example during a cold start, or which have not been introduced or have not broken loose into the lubricating oil cycle until downstream of the main oil separator. Since the particle separator is coarser than the main oil separator, premature consumption and the danger of blockage due to separated solid particles is countered. In this way, the solid particles identified as critical are in particular effectively separated, and a long operating time without the need for maintenance is simultaneously achieved.

For operations without the need for maintenance and/or for a long service life, it is favourable if the separation efficiency of the particle separator is at most 30% or, as is preferred, at most 10% for particles up to the particle size P2. It is possible to attune the particle separator to the separating properties of the main oil separator in a particularly favourable way by having the separation curve of the particle separator no longer overlap with the separation curve of the main oil separator but rather be employed only above or ideally at the particle size P2.

In advantageous embodiments, the particle separator exhibits a gravimetric separation efficiency of at least 90% at a particle size P4 of less than 100 µm. It is advantageous if the particle size P4 is at most 90 µm or at most 80 µm. In such embodiments, the particle separator exhibits a separation efficiency of at least 90% for particles at or above a particle size of 90 µm or, as is preferred, for particles about a particle size of 80 µm. It is equally advantageous if the particle separator exhibits a separation efficiency of at least 95% or a separation efficiency of 100% for solid particles of the particle size P4 and larger.

Dirt particles made of different materials are contained in the engine lubricating oil. Engine lubricating oil typically contains sand particles, corundum particles, metal particles and/or soot particles. The separating properties of separators are dependent not only on the particle size but also on the material of the particles. The specified separation efficiencies apply at least to particles made of a material from the group of materials consisting of sand, corundum, metal and metal alloys, wherein the metal and the metal alloys can in particular be iron, iron-based alloys, aluminium and aluminium-based alloys. The separation efficiencies advantageously apply at least to corundum particles and/or sand particles of the respective particle size. In order to ascertain the separation efficiencies, sand particles and/or corundum particles of the respective particle size are therefore added to a clean oil in preferred test procedures. On the one hand, sand particles and corundum particles contribute significantly to the damage to moving parts of cam shaft phase adjusters, and on the other hand, they are highly suitable for testing and comparing purposes due to the compactness of the particles. They more closely approximate a spherical shape than for example metal filings.

Using a test powder made of particles of the respective particle size, the separation efficiencies can be ascertained in a single-pass or multi-pass test procedure by means of optical evaluation with a particle count or gravimetric evaluation by means of weight analysis. The separation efficiencies can thus for example be ascertained in a multi-pass test procedure according to ISO 4548-12, to name but one example.

It may also be noted with regard to the particle size that particles are assigned to a given particle size which deviate in their particle size by at most 5% from the given numerical value. If, for example, 100 µm is given as the particle size, then all particles having a particle size between 95 and 105 µm will qualify as this particle size. If a size range, for example 10 µm to 20 µm, is given for the particle size, then the said 5% is already incorporated in the numerical values for the range limits.

The particle separator can be provided in the engine lubricating oil feed for one cam shaft phase adjuster only or for multiple cam shaft phase adjusters jointly. Correspondingly, first embodiments of the particle separator can be configured to protect one cam shaft phase adjuster only from dirt particles, and second embodiments of the particle separator can be configured to protect a system of multiple cam shaft phase adjusters from dirt particles. The particle separator can be arranged in a lubricating oil flow which, once it has been cleaned by means of the particle separator, is not simply fed to one or more cam shaft phase adjuster(s) but is rather split into two or more partial flows, wherein one or more of the partial flows is/are fed to one or more other consumer(s), for example a turbocharger and/or a hydraulic valve drive equalising element. In advantageous embodiments, however, the lubricating oil cleaned by the particle separator is simply fed directly to one or more phase adjuster(s).

The particle separator is configured such that, taking into account common dirt size distribution spectra in engine lubricating oil, small particles which compromise the functionality of the individual cam shaft phase adjuster or system of adjusters are separated—particles which have hitherto passed the filter screens which are known from the prior art and arranged in the cam shaft phase adjuster. Conversely, the configuration is such that it avoids an overload and therefore malfunction in the particle separator, which is limited in the constructional dimensions which can be realised in its design, for operating durations which are as long as possible and preferably for the whole of the service life of the internal combustion engine. One measure in accordance with the invention is therefore that of arranging the particle separator as a whole or at least a separating stage of the particle separator upstream of the phase adjuster or system of phase adjusters.

In first embodiments, the particle separator comprises only one separating stage, i.e. it is a single-stage particle separator.

In second embodiments, particles are separated by the particle separator in multiple separating stages. The particle separator is therefore composed of multiple separating stages in the second embodiments, specifically a first separating stage and at least one additional, second separating stage. The second separating stage is arranged downstream of the first separating stage in the flow direction of the engine lubricating oil. The separating stages can differ from each other in their separating mode and/or separating fineness. The second separating stage can thus in particular be configured for separating particles of smaller particle size than the first separating stage. Expressed in separation efficiencies, this can for example mean that the first separating stage exhibits a separation efficiency of 50% for all particles of a first particle size, and the second separating stage exhibits a separation efficiency of 50% for all particles of a second particle size which is smaller than the first particle size. In such embodiments, the lubricating oil is pre-cleaned in the first separating stage, for the second separating stage. The first separating stage forms a pre-separator for the second separating stage. It decongests the second separating stage which separates finer particles. Decongesting the second separating stage is however also advantageous in embodiments in which the second separating stage corresponds to the first separating stage with regard to its separating fineness or is even coarser than the latter in regions or operates according to a separating principle which is not comparable or hardly comparable to the separating principle of the first separating stage. If, for example, the first separating stage comprises a centrifugal force separator and the second separating stage comprises a filter structure featuring a filter medium which the lubricating oil can flow through, these two separating stages are comparable at least when the centrifugal force separator comprises an absorbing medium for absorbing and trapping particles. In such embodiments, the absorbing medium can be directly compared with the filter medium with regard to its fineness, for example by way of one or more characterising separation efficiencies.

If the particle separator comprises the first and second separating stage, at least the first separating stage is arranged upstream of the cam shaft phase adjuster. It is advantageous if the second separating stage is also arranged upstream of the phase adjuster. If the particle separator comprises the first and second separating stage and optionally one or more additional separating stages which are arranged in series in the flow direction, then each of these additional separating stages is also arranged upstream of the phase adjuster in preferred embodiments.

The separating stages can in particular be arranged in immediate succession in the flow direction of the engine lubricating oil, such that each separating stage is followed by a subsequent separating stage in the flow direction and there is no functional component arranged between any two separating stages which does not serve the separating function of the particle separator but which could introduce dirt particles into the lubricating oil. The separating stages are advantageously connected to each other only via conduit paths. One or more structures which serve to support the separating function can however be arranged in the respective connecting conduit.

If the particle separator comprises multiple separating stages, including the first separating stage and second separating stage mentioned above, the separating stages can differ from each other in their design. The second separating stage or an additional, third separating stage which is optionally arranged downstream of the second separating stage can thus in particular be a filter structure featuring a filter medium which the engine lubricating oil can flow through. At least the most downstream separating stage is expediently a filter structure featuring a filter medium which the engine lubricating oil can flow through. The filter medium of the respective filter structure is advantageously pleated, i.e. placed in folds around at least a part of and preferably all of the circumference of a filter axis.

If the particle separator comprises multiple separating stages, for example the first separating stage and second separating stage mentioned, the first separating stage or an optionally additional separating stage which is arranged upstream of the first separating stage in the flow direction of the engine lubricating oil can be a centrifugal force separator or a centrifugal separator or a combination of the two. In accordance with the invention, "centrifugal force separator" refers to a separator or separating stage in which the engine lubricating oil performs a rotational movement about a longitudinal axis of the relevant separator or separating stage, wherein a circumferential wall of the separator or separating stage which surrounds the engine lubricating oil during its rotational movement can rotate about the longitudinal axis or can be stationary. In accordance with the invention, a "centrifugal separator" is understood to be a separator or separating stage in which the circumferential wall of the centrifugal separator rotates about the longitudinal axis when the particle separator is in operation. A centrifugal separator therefore comprises a rotary body featuring a hollow space in which the relevant rotary body imposes a rotational movement on the engine lubricating oil through its own rotation. A centrifugal separator can also comprise one or more flow channelling structures which support the rotational movement by additionally imbuing the engine lubricating oil with a rotational impulse as it flows into or through the centrifugal separator, which supports the rotational impulse generated by the rotation of the rotary body of the centrifugal separator, i.e. acts in the same rotational direction. Wherever a centrifugal force separator is mentioned in the following, this is intended to encompass both a non-rotating centrifugal force separator and a centrifugal separator. The first separating stage or an optional additional separating stage which is arranged upstream of the first separating stage can also be formed as a cyclone separator.

In advantageous embodiments, a centrifugal force separator can be formed in a hollow space of a rotary body which can be rotary-driven, i.e. in a body which rotates when the internal combustion engine is in operation. The rotary body can in particular be a cam shaft or also in principle a different rotary body in which the lubricating oil can be fed through its hollow space to the phase adjuster. Forming a centrifugal force separator in the cam shaft has the particular advantage that such a centrifugal force separator can be arranged in close proximity to the phase adjuster. The centrifugal force separator can for example be realised in an axial end portion of the cam shaft at which the rotor of the phase adjuster is or can be fitted.

A stator of the phase adjuster can comprise the hollow space in order to form a centrifugal force separator. In such embodiments, the centrifugal force separator is again arranged upstream of a pressure port of the control valve of the phase adjuster and therefore upstream of the phase adjuster in terms of flow dynamics. A centrifugal force separator which is formed in the stator has the advantage that a stator hollow space can have a comparatively large radial distance from the rotational axis of the stator, such that in accordance with the radial distance, a large centrifugal force acts on the lubricating oil in the hollow space. If the stator surrounds the rotor and the stator comprises inwardly projecting vanes and the rotor comprises outwardly projecting vanes, between which pressure chambers are formed for adjusting the rotational angular position of the rotor relative to the stator, the hollow space extends on the radially outer side from the pressure chambers. The lubricating oil is expediently fed to the phase adjuster near the rotational axis and, as viewed in the longitudinal section of the phase adjuster, is guided on the radially outer side from the pressure chambers, around the pressure chambers, through the hollow space and then back towards the rotational axis, to the pressure port of the control valve. The hollow space can extend 360° around the rotational axis of the stator as a hollow space ring. The hollow space can instead also extend over an angular segment only and can correspondingly be a hollow space annular segment only. If the hollow space extends over an angular segment only, two or more hollow space annular segments are arranged next to each other in the circumferential direction in a distribution about the rotational axis in advantageous embodiments, in order to obtain a stator exhibiting a mass distribution about the rotational axis which is as uniform as possible and thus exhibiting as little imbalance as possible. The rotational axis of the stator is the central longitudinal axis of the hollow space ring or the one or more hollow space annular segments, about which the lubricating oil in the respective hollow space performs a rotational movement together with the stator and relative to which it experiences a centrifugal force.

In simple embodiments, the centrifugal force separator can be formed in the respective hollow space by a radial, axially local widening of the hollow space, such that dirt particles collect in the widening due to the action of the centrifugal force. In preferred embodiments, the centrifugal force separator comprises an open-pored absorbing medium or an absorbing structure extending around the rotational axis of the rotary body at or near a circumferential wall of the hollow space. The porous absorbing medium can line the complete 360° circumference of the circumferential wall or at least a majority of the circumference. An absorbing structure can comprise absorbing pockets for dirt particles. The absorbing pockets can be formed in the circumferential wall of the hollow space or can be formed by inwardly protruding structures, for example scoops, in co-operation with the circumferential wall. Alternatively, a circumferential wall of the respective hollow space can be provided with a structured surface in order to trap dirt particles.

The absorbing medium can in particular be or contain fibrous material, fabric material, a mesh or an open-pored foam material. It can also comprise several of these materials—or all of the materials mentioned—in combination, for example in a radially layered arrangement. The centrifugal force separator can also be formed in the hollow space by a combination of the designs mentioned, specifically a simple widening and/or an absorbing medium and/or a shaped absorbing structure and/or an incorporated structured surface. It is thus possible to arrange an absorbing medium axially next to an absorbing structure or to arrange an absorbing medium in a radial widening or to arrange a widening axially next to an absorbing medium and/or an absorbing structure. The absorbing medium absorbs dirt particles and permanently traps them, such that they do not escape again when the centrifugal force is discontinued. The same applies in relation to the absorbing structure. If the centrifugal force separator only comprises a radial widening having a smooth circumferential wall, the hollow space for trapping the dirt particles can be delineated upstream of an annular gap which prevents the particles separated into the widening due to the centrifugal force from being able to flow off from the hollow space towards the phase adjuster without hindrance when the centrifugal force abates or is discontinued.

The centrifugal force separator can advantageously extend over a considerable axial length. The axial length of the radial widening and/or absorbing material and/or absorbing structure is understood to be the axial length of the centrifugal force separator. In advantageous embodiments, the axial length of the centrifugal force separator understood in this way is at least 10 cm, more preferably at least 20 cm, and can advantageously be more than 30 cm or more than 40 cm. As far as the centrifugal force separator is concerned, the longer the better. In commercial vehicles, the centrifugal force separator can even exhibit a length of 50 cm and more. If the phase adjuster takes up lubricating oil, specifically in order to change the rotational angular position of the cam shaft relative to the driving crankshaft, said oil flows axially through the centrifugal force separator. As the length of the centrifugal force separator increases, the dwelling time of the lubricating oil in the centrifugal force separator and thus the period of time available for separating into the widening and/or the absorbing medium and/or absorbing structure is increased. The greater the dwelling time is, the more effectively dirt particles are separated in the centrifugal force separator. Another aid to separating is that the dirt particles already in an absorbing medium and/or absorbing structure are pushed radially outwards for longer and thus further and are therefore more securely trapped in the absorbing medium or absorbing structure. In an absorbing medium, the radially inner depth range near the rotational axis of the rotary body or the rotational flow of the lubricating oil can be maintained for absorbing additional dirt particles for longer due to the dirt particles moving radially outwards. With a view to an operating duration without the need for maintenance which is as long as possible, it is also advantageous for the absorbing capacity of the centrifugal force separator to increase with the axial length of the centrifugal force separator. The centrifugal force separator can achieve an absorbing capacity for dirt particles of 10 g and more, in preferred embodiments at least 20 g and for all intents and purposes even absorbing capacities of 50 g and more.

A displacement body can be provided in the hollow space, such that in the region of the displacement body within the hollow space, the lubricating oil only flows through an annular volume which is delineated on its inner side by the displacement body and on its outer side by the circumferential wall of the body which forms the hollow space. This reduces the dead volume within the hollow space. The displacement body can be arranged in the hollow space, which also includes embodiments in which the displacement body is not fastened to the body itself which forms the hollow space but rather to a different body. The displacement body can extend over all or only some of the length of the hollow space. A displacement body can for example be cylindrical, in particular circularly cylindrical. The displacement body can be centred on the body itself which forms the hollow space, and for example comprise projections on its outer circumference, for example in the form of centring lugs which contact the circumferential wall of the body when installed. Such a displacement body can be inserted axially into the hollow space and immediately centres itself, by means of the projections, on the body which forms the hollow space. A displacement body can in particular be provided in a hollow space formed by the cam shaft.

Alternatively or additionally, a centrifugal force separator can also be formed in a non-rotating body, in particular a pressure storage arranged upstream of the phase adjuster. In such embodiments, the centrifugal force separator can in particular be realised as a cyclone separator featuring a tangential inflow of the lubricating oil. Instead of or preferably in addition to a tangential inflow direction, one or more flow channelling devices can be realised in the hollow space which imbue the lubricating oil with a rotational impulse as it flows through the hollow space and advantageously amplify an already available rotational impulse. An inlet for an inflow of the lubricating oil featuring a tangential directional component and/or a different flow channelling device, realised in the respective hollow space, for deflecting with a tangential directional component can advantageously also be realised in combination with embodying the centrifugal force separator in a rotary body which can be rotary-driven. In such embodiments, the centrifugal force separator is simultaneously also a centrifugal separator.

A rotational flow of the lubricating oil in the hollow space relative to a circumferential wall of the hollow space is also in principle advantageous when a filter structure featuring a filter medium which the lubricating oil can flow through extends in the hollow space. The filter medium of such a filter structure can protrude into the hollow space, protrude through the hollow space or can be fastened in the hollow space. Wherever arranging the filter structure in the hollow space is mentioned, this is intended to encompass at least these three ways of extending in the hollow space. The filter medium can extend around a filter axis of the filter structure, such that it surrounds an interior space of the filter which extends along the filter axis. The filter structure can be arranged in the hollow space such that the lubricating oil flows through the filter medium from the outside to the inside and flows off through the interior space of the filter and a filter outlet. It is also advantageous for such filtering if the lubricating oil does not flow exactly radially through the filter medium but rather also flows around the filter medium at the outer circumference, including in the axial direction and/or the tangential direction, such that transverse filtering is achieved. Generating a rotational flow relative to the circumferential wall of the hollow space is thus also advantageous for filtering by means of the filter medium which the lubricating oil can flow through and not only in conjunction with a centrifugal force separator. A centrifugal force separator can however surround the filter medium or at least an axial partial portion of the filter medium, in order to also be able to extract dirt particles by centrifuging at the axial level of the filter medium. In preferred embodiments, however, a centrifugal force separator is provided upstream or at least also upstream of the filter structure, i.e. upstream of the filter medium of the filter structure, in order to reduce the load on the filter medium.

It is possible to arrange a centrifugal force separator and also a filter structure in the hollow space. It is also possible to arrange a centrifugal force separator and a filter structure in two hollow spaces which are separate from each other but connected by one or more connecting conduits and/or connecting channels.

If the particle separator comprises a filter structure featuring a filter medium which the lubricating oil flows through for cleaning purposes, and if such a filter structure is the only separating stage or the most downstream separating stage of the particle separator, said filter structure can in particular exhibit the separation efficiency or efficiencies specified for the particle separator in Claim 1. In advantageous embodiments, the filter structure also exhibits—subject to the preconditions mentioned—one or more of the separation efficiencies specified or resulting for the particle separator in the sub-claims. The filter structure can thus be subjected to a verification of the separation efficiencies in isolation. One or more separating stages arranged upstream of the filter structure perform pre-cleaning in order to prevent premature consumption of the filter medium of the filter structure. Conversely, a centrifugal force separator can in advantageous embodiments also achieve one or more or all of the separation efficiencies specified for the particle separator.

A centrifugal force separator or cyclone separator which is arranged downstream of the main oil separator is already advantageous in its own right. The Applicant therefore reserves the right to direct an application to a particle separating system which comprises the described main oil separator and an additional particle separator featuring a centrifugal force separator and/or cyclone separator which as such can, but need not, correspond to Feature 1.3 in Claim 1.

A particle separator which comprises a filter structure, featuring a filter medium which the lubricating oil can flow through, and which is arranged downstream of the main oil separator and upstream of a pressure port of the control valve of the phase adjuster similarly represents self-contained subject-matter. Such a filter structure, i.e. its filter medium, can in particular exhibit a separation efficiency in accordance with Feature 1.3 in Claim 1 and optionally one or more of the separation efficiencies specified in the sub-claims.

Wherever it is mentioned that the particle separator comprises a centrifugal force separator and/or a filter structure featuring a filter medium which the lubricating oil can flow through, this means that the respective particle separator can comprise one or more other separators in addition to the centrifugal force separator and/or the filter structure, or that it can consist of the centrifugal force separator only or the filter structure only or the centrifugal force separator and the filter structure only. The word "comprise" always includes the meaning "consists of".

A particle separator which comprises multiple separating stages, at least one of which is arranged upstream of the phase adjuster or upstream of a system of multiple phase adjusters which are jointly supplied with the lubricating oil as a pressure medium via the particle separator, can also be self-contained subject-matter of the claims. A particle separating system comprising a main oil separator corresponding to Claim 1 and a multi-stage particle separator which advantageously can, but need not, correspond to Feature 1.3 in Claim 1 is also self-contained subject-matter of the claims. Embodying the particle separator as a multi-stage particle separator is in principle conducive to attuning it to the separating properties of a main oil separator.

Advantageous features of a particle separating system and of the particle separator in its own right are also disclosed in the sub-claims and in combinations of the sub-claims.

Features of the invention are also described in the aspects formulated below. The aspects are worded in the manner of claims and can substitute for them. Features disclosed in the aspects can also supplement and/or qualify the claims, indicate alternatives to individual features and/or broaden claim features. Bracketed reference signs refer to example embodiments of the invention which are illustrated below in figures. They do not restrict the features described in the aspects to their literal sense as such, but do conversely indicate preferred ways of realising the respective feature. Subject-matter for claims of further applications also in particular follows from the aspects.

Aspect 1. A particle separating system for supplying a hydraulic cam shaft phase adjuster with cleaned engine lubricating oil as a pressure medium, wherein the cam shaft phase adjuster (10) comprises a stator (11) which can be rotary-driven, a rotor (12) which is or can be connected to a cam shaft (6), and a control valve (13-19) for hydraulically adjusting the rotational angular position of the rotor (12) relative to the stator (11), wherein the particle separating system comprises:

1.1 a main oil separator (3) which is arranged in the flow of the engine lubricating oil, upstream of a lubricating oil gallery (5) of an internal combustion engine which is to be supplied with the engine lubricating oil, 1.2 and a particle separator (20; 30; 40; 50; 80) which is arranged downstream of the main oil separator (3) and upstream of the cam shaft phase adjuster (10) or control valve (13-19), in order to clean the engine lubricating oil for the cam shaft phase adjuster (10).

Attuning the Separators

Aspect 2. The particle separating system according to the preceding aspect, wherein 2.1 the main oil separator (3) exhibits a separation efficiency of at least 50% for particles of a particle size P1 and a separation efficiency of at least 90% at a particle size P2>P1, 2.2 and the particle separator (20; 30; 40; 50; 80) exhibits a separation efficiency of 50% at a particle size P3, where P1<P3<100 μm.

Aspect 3. The particle separating system according to the preceding aspect, wherein the particle separator (20; 30; 40; 50; 80) exhibits a separation efficiency of at least 90% at a particle size P4, where P2<P4<100 μm.

Aspect 4. The particle separating system according to any one of the preceding aspects in combination with Aspect 2, wherein the separation efficiency of the particle separator (20; 30; 40; 50; 80) is at most 30%, preferably at most 10%, at the particle size P2.

Aspect 5. The particle separating system according to any one of the preceding aspects in combination with Aspect 2, wherein P2<P3.

Aspect 6. The particle separating system according to any one of the preceding aspects in combination with Aspect 2, wherein P3>40 μm and/or P3<80 μm.

Aspect 7. The particle separating system according to any one of the preceding aspects in combination with Aspect 2, wherein the particle size P3 is at most 70 μm or at most 60 μm.

Aspect 8. The particle separating system according to any one of the preceding aspects in combination with Aspect 2, wherein P4<90 μm or P4<80 μm.

Aspect 9. The particle separating system according to any one of the preceding aspects in combination with Aspect 2, wherein P2>30 μm and/or P2<50 μm.

Aspect 10. The particle separating system according to any one of the preceding aspects in combination with Aspect 2, wherein P1>10 μm and/or P1<20 μm.

Aspect 11. The particle separating system according to any one of the preceding aspects in combination with Aspect 2, wherein the separation efficiencies are initial separation efficiencies.

Aspect 12. The particle separating system according to any one of the preceding aspects in combination with Aspect 2, wherein the diameter of a spherical volume which is equivalent to the volume or mass of the respective particle is used as the respective particle size, such that the separation efficiencies are $\eta_{3,50}$ and $\eta_{3,90}$ separation efficiencies.

Aspect 13. The particle separating system according to any one of the preceding aspects in combination with Aspect 2, wherein the separation efficiencies are separation efficiencies which are ascertained using a test powder made of particles of the respective particle size (P1, P2, P3, P4) in a single-pass or multi-pass test procedure by means of optical evaluation with a particle count or gravimetric evaluation by means of weight analysis.

Aspect 14. The particle separating system according to any one of the preceding aspects in combination with Aspect 2, wherein the separation efficiencies are separation efficiencies which are ascertained in a multi-pass test procedure according to ISO 4548-12.

Aspect 15. The particle separating system according to any one of the preceding aspects in combination with Aspect 2, wherein the separation efficiencies apply at least to particles made of a material from the group of materials consisting of sand, corundum, metal and metal alloys, wherein the metal and the metal alloys can in particular be iron, iron-based alloys, aluminium and aluminium-based alloys.

Aspect 16. The particle separating system according to any one of the preceding aspects in combination with Aspect 2, wherein the separation efficiencies apply at least to corundum particles and/or sand particles.

Single-Stage or Multi-Stage Particle Separator Upstream of the Control Valve or Phase Adjuster as a Whole Aspect 17. The particle separating system according to any one of the preceding aspects, wherein the particle separator (20; 30; 40; 50; 80) comprises at least one separating stage (21, 22; 28, 22; 31, 32; 40, 32; 51, 62; 81) for separating particles which is arranged upstream of the cam shaft phase adjuster (10) or upstream of the control valve (13-19).

Aspect 18. The particle separating system according to any one of the preceding aspects, wherein the cam shaft phase adjuster (10) can be fitted as a design unit and the particle separator (20; 30; 40; 50) comprises at least one separating stage (21, 22; 28, 22; 31, 32; 40; 51, 62) for separating particles which is arranged upstream of the cam shaft phase adjuster (10) and separately from the cam shaft phase adjuster (10).

Aspect 19. The particle separating system according to any one of the preceding aspects, wherein the particle separator (20; 30; 40; 50) comprises a first separating stage (21; 28; 31; 40; 51) for separating particles and, downstream of the first separating stage, a second separating stage (22; 32; 62) for separating particles, and wherein at least the first separating stage (21; 28; 31; 40; 51) and optionally also the second separating stage (22; 32; 62) is arranged upstream of the cam shaft phase adjuster (10) or upstream of the control valve (13-19) in the flow direction of the engine lubricating oil.

Aspect 20. The particle separating system according to the preceding aspect, wherein the first separating stage (21; 28; 31; 40; 51) is a centrifugal force separator and/or centrifugal separator (21; 28; 31; 51) or a cyclone separator (40).

Aspect 21. The particle separating system according to any one of the immediately preceding two aspects, wherein the second separating stage (22; 32; 62) is a filter structure (22; 32; 62) featuring a filter medium (23; 33; 63) which the engine lubricating oil can flow through.

Aspect 22. The particle separating system according to the preceding aspect, wherein the filter structure (22; 32; 62) is a filter cartridge.

Aspect 23. The particle separating system according to any one of the immediately preceding four aspects, wherein the second separating stage (22; 32; 62) is configured to separate smaller particles than the first separating stage (21; 28; 31; 40; 51).

Aspect 24. The particle separating system according to any one of the immediately preceding five aspects, wherein the second separating stage (22; 32; 62) exhibits a separation efficiency specified for the particle separator (20; 30; 40; 50) according to at least one of Aspects 1 to 16.

Aspect 25. The particle separating system according to the preceding aspect, wherein the first separating stage (21; 28; 31; 40; 51) exhibits a separation efficiency of less than 50% at the particle size P3.

Aspect 26. The particle separating system according to any one of the preceding aspects, wherein the cam shaft phase adjuster (10) comprises a pressure chamber for hydraulically adjusting the rotational angular position of the rotor (12) relative to the stator (11) by applying pressure to the rotor (12) using the engine lubricating oil, and the control valve (13-19) comprises a pressure port (P; 84) for feeding the engine lubricating oil, a working port (A, B) for the engine lubricating oil which is connected to the pressure chamber, a tank port (T) for draining the engine lubricating oil, and a valve piston (14) which can be moved back and forth between a first control position and a second control position, the working port (A, B) is connected to the pressure port (P; 84) in the first control position and separated from the pressure port (P; 84) and connected to the tank port (T) in the second control position, and the particle separator (20; 30; 40; 50; 80) comprises at least one separating stage (21, 22; 28, 22; 31, 32; 40; 51, 62; 81) for separating particles which is arranged upstream of the pressure port (P; 84).

Aspect 27. The particle separating system according to the preceding aspect, wherein the at least one separating stage (21, 22; 28, 22; 31, 32; 40; 51, 62; 81) is arranged immediately upstream of the pressure port (P; 84).

Aspect 28. The particle separating system according to any one of the preceding aspects, wherein an outlet (25; 35; 65) of the at least one separating stage (21, 22; 28, 22; 31, 32; 40; 51, 62) according to any one of the immediately preceding two aspects feeds into a pressure port (P) of the control valve (13-19), preferably in axial alignment with the axially orientated pressure port (P), and wherein the outlet (25; 35; 65) preferably forms the outlet of the particle separator (20; 30; 40; 50) as a whole.

Filter Structure Featuring a Filter Medium which Fluid can Flow Through

Aspect 29. The particle separating system according to any one of the preceding aspects, wherein the particle separator (20; 30; 50), for example the second separating stage according to Aspect 19, comprises a filter structure (22; 32; 62), and the filter structure (22; 32; 62) comprises a filter medium (23; 33; 63), which the engine lubricating oil can flow through, for trapping particles contained in the engine lubricating oil.

Aspect 30. The particle separating system according to the preceding aspect, wherein the filter medium (23; 33; 63) surrounds a longitudinal axis (R) of the filter structure (22; 32; 62), for example over a circumferential angle of 360°, and is cylindrical or widens, for example conically, in the longitudinal direction of the filter.

Aspect 31. The particle separating system according to the preceding aspect, wherein the filter medium (23; 33; 63) widens towards the cam shaft phase adjuster (10).

Aspect 32. The particle separating system according to any one of the immediately preceding three aspects, wherein the filter medium (23; 33; 63) is pleated.

Aspect 33. The particle separating system according to any one of the immediately preceding four aspects, wherein:
the filter structure (22; 32; 62) is arranged in a hollow space (7; 37, 39; 67);
the hollow space (7; 37, 39; 67) comprises an inlet (8; 38; 68), and the filter structure (22; 32; 62) comprises a filter outlet (25; 35; 65), for the engine lubricating oil;
the filter medium (23; 33; 63) surrounds an interior space of the filter, and an annular hollow space volume (9; 39) remains around an outer circumference of the filter medium (23; 33; 63), in which the engine lubricating oil can flow around the outer circumference of the filter medium (23; 33; 63);
and wherein the inlet (8; 38; 68) of the hollow space (7; 37, 39; 67) and the filter outlet (25; 35; 65) are arranged relative to the filter structure (22; 32; 62) in such a way that engine lubricating oil which flows through the inlet (8; 38; 68) into the hollow space (7; 37, 39; 67) flows through the filter structure (22; 32; 62) with a radial directional component.

Aspect 34. The particle separating system according to the preceding aspect, wherein the inlet (8; 38; 68) of the hollow space (7; 37, 39; 67) and the filter outlet (25; 35; 65) are arranged relative to the filter structure (22; 32; 62) in such a way that engine lubricating oil which flows through the inlet (8; 38; 68) into the hollow space (7; 37, 39; 67) flows through the filter structure (22; 32; 62) from the outside to the inside.

Aspect 35. The particle separating system according to any one of the immediately preceding six aspects, wherein the filter structure (22; 32; 62) is arranged in a hollow space (7; 37, 39; 67) of the cam shaft (6) or a different rotary body (36).

Aspect 36. The particle separating system according to any one of the immediately preceding seven aspects, wherein the filter medium (23; 33; 63) exhibits an inflow side and an outflow side for the engine lubricating oil and is embodied as a graded medium, such that the filter medium (23; 33; 63) is more open on the inflow side than on the outflow side.

Aspect 37. The particle separating system according to any one of the immediately preceding eight aspects, wherein the filter structure (22; 32; 62) forms the particle separator.

Aspect 38. The particle separating system according to any one of the immediately preceding nine aspects, wherein the filter structure (22; 32; 62) comprises only one layer of the filter medium (23; 33; 63).

Aspect 39. The particle separating system according to any one of Aspects 29 to 37, wherein the filter structure (22; 32; 62) comprises multiple layers of filter media (23; 33; 63) which are consecutive in the direction of passage, the filter media (23; 33; 63) differ from each other in relation to their porosity, and the porosity of the layers decreases in the direction of passage, preferably from one layer to the respectively following layer in the direction of passage.

Aspect 40. The particle separating system according to any one of Aspects 29 to 39, wherein the filter medium (23; 33; 63) is embodied as a deep-bed filter.

Aspect 41. The particle separating system according to any one of Aspects 29 to 40, wherein the filter medium (23; 33; 63) contains fibrous material, for example fleece material, and/or fabric material and/or a mesh and/or open-pored foam material and/or comprises a perforated or lattice structure.

Aspect 42. The particle separating system according to any one of Aspects 29 to 41, wherein the filter medium (23; 33; 63) contains a sintered metallic fibrous material and/or metallic fabric material and/or metallic mesh and/or an open-pored metal foam material and/or comprises a metallic perforated or lattice structure.

Aspect 43. The particle separating system according to any one of Aspects 29 to 42, wherein the filter structure (22; 32; 62) extends upstream of a working port (A) or pressure port (P) of the control valve (13-19), preferably entirely upstream of the control valve (13-19).

Aspect 44. The particle separating system according to any one of Aspects 29 to 43, wherein:
the filter structure (62) comprises a tubular outflow portion (69) for engine lubricating oil flowing off from the phase adjuster (10);
the filter medium (63) extends around the outflow portion (69); and
an interior space of the filter comprising a filter outlet (65) for engine lubricating oil flowing to the control valve (13-19) is formed between the outflow portion (69) and the filter medium (63).

Aspect 45. The particle separating system according to any one of Aspects 29 to 44, wherein the filter structure (22; 32; 62) exhibits one or more of the separation efficiencies specified for the particle separator (20; 30; 40; 50) according to at least one of Aspects 1 to 16.

Centrifugal Force Separator

Aspect 46. The particle separating system according to any one of the preceding aspects, wherein
the engine lubricating oil can be fed to the cam shaft phase adjuster (10) through a hollow space (7; 37, 39; 47; 57, 67; 87) which is delineated by one or more bodies (6; 6, 36; 41, 42; 6, 56; 11),
and wherein
a flow channelling device (8, 26; 38; 48; 54, 58, 68; 83a, 83b) is provided which imbues the engine lubricating oil with a rotational impulse about a longitudinal axis (R) which is central in relation to the hollow space (7; 37, 39; 47; 57, 67; 87) as it flows into the hollow space and/or as it flows through the hollow space, and/or
a body (6; 6, 36; 11) which delineates the hollow space (7; 37, 39; 57, 67; 87) is a rotary body which rotates about a longitudinal axis (R) which is central in relation to the hollow space (7; 37, 39; 47; 57, 67; 87) when the cam shaft phase adjuster (10) is in operation.

Aspect 47. The particle separating system according to the preceding aspect, wherein the particle separator (20; 30; 40; 50; 80), for example the first separating stage according to Aspect 19, comprises a centrifugal force separator (21; 28; 31; 46; 51; 81), which extends around the central longitudinal axis (R) in the hollow space (7; 37, 39; 47; 57, 67; 87), for absorbing and trapping particles which enter the centrifugal force separator (21; 28; 31; 46; 51; 81) due to centrifugal force.

Aspect 48. The particle separating system according to the preceding aspect, wherein the centrifugal force separator (21; 28; 31; 46; 51; 81) comprises an absorbing medium which lines a circumferential wall surrounding the hollow space (7; 37, 39; 47; 57; 87) on the radially outer side and/or forms absorbing pockets (29) for particles with the circumferential wall, and/or the circumferential wall comprises a structured surface (81) for trapping particles.

Aspect 49. The particle separating system according to any one of the immediately preceding two aspects, wherein the centrifugal force separator (21; 28; 31; 51) exhibits an axial length of at least 20 cm or at least 30 cm or at least 40 cm.

Aspect 50. The particle separating system according to any one of the immediately preceding three aspects, wherein the flow channelling device (8, 26; 38; 48; 54, 58, 68; 83a, 83b) comprises an inlet (8; 38; 48; 58; 68; 83a, 83b) of the hollow space (7; 37, 39; 47; 57, 67; 87), and the inlet (8; 38; 48; 58; 68; 83a, 83b) is embodied such that the engine lubricating oil flows into the hollow space (7; 37, 39; 47; 57, 67; 87) with a directional component which is tangential in relation to the central longitudinal axis (R).

Aspect 51. The particle separating system according to any one of the immediately preceding four aspects, wherein the flow channelling device (8, 26; 54, 58, 68) comprises one or more deflecting structures (26; 54) in the hollow space (7; 57) which deflect/s the engine lubricating oil in the hollow space (7; 57) in a direction which is tangential with respect to the central longitudinal axis (R).

Aspect 52. The particle separating system according to any one of the immediately preceding six aspects, wherein the cam shaft (6) or a different rotary body (36; 11) which cannot be rotated relative to the stator (11) or the rotor (12) delineates the hollow space (7; 37, 39; 57; 67; 87) on the radially outer side and/or on the radially inner side.

Aspect 53. The particle separating system according to any one of the immediately preceding seven aspects, wherein the hollow space (87) extends in the stator (11) near an outer circumference of the stator (11), and the rotational axis (R) of the stator (11) forms the longitudinal axis (R) which is central in relation to the hollow space (87).

Aspect 54. The particle separating system according to the preceding aspect, wherein multiple hollow spaces (87) in the form of hollow space annular segments extend in the stator (11), successively in the circumferential direction, near the outer circumference of the stator (11).

Aspect 55. The particle separating system according to any one of the immediately preceding two aspects, wherein one or more feed channels (82a) through which lubricating oil can be fed to the one or more hollow spaces (87) extend radially outwards in the stator (11), and one or more continuative drainage channels (82b) through which lubricating oil can be drained from the one or more hollow spaces (87) extend radially inwards in the stator (11).

Aspect 56. The particle separating system according to any one of the immediately preceding three aspects, wherein multiple mutually separate hollow spaces (87) in the form of hollow space annular segments extend in the stator (11), successively in the circumferential direction, near the outer circumference of the stator (11), and each of the hollow spaces (87) is assigned a feed channel (82a) for feeding the lubricating oil to the respective hollow space (87) and a continuative drainage channel (82b) for draining the lubricating oil from the respective hollow space (87).

Aspect 57. The particle separating system according to any one of the immediately preceding four aspects, wherein in order to trap particles contained in the lubricating oil, an outer circumferential wall of the respective hollow space (87) comprises a structured surface (81) and/or absorbing medium for the particles is arranged in the respective hollow space (87).

Aspect 58. The particle separating system according to any one of Aspects 46 to 52, wherein: the rotor (12) of the cam shaft phase adjuster (10) is non-rotationally connected to the cam shaft (6) by means of a hollow body (36); the hollow body (36) is non-rotationally connected to an axial end portion of the cam shaft (6) and surrounds the end portion; a hollow space (39) which is formed in the hollow body (36) in an axial extension of the cam shaft (6) exhibits a cross-section which is at least as large as an outer cross-section of the end portion of the cam shaft (6); and a separating stage (32) of the particle separator (30) is arranged in the hollow space (39) of the hollow body (36).

Aspect 59. The particle separating system according to any one of the preceding aspects in combination with Aspect 47, wherein the centrifugal force separator (21; 31; 51; 81) comprises an open-pored absorbing medium for particles.

Aspect 60. The particle separating system according to the preceding aspect, wherein the absorbing medium contains fibrous material, for example fleece material, and/or fabric material and/or mesh and/or an open-pored foam material and/or comprises a perforated or lattice structure.

Aspect 61. The particle separating system according to any one of the immediately preceding two aspects, wherein the absorbing medium contains sintered metallic fibrous material and/or metallic fabric material and/or metallic mesh and/or open-pored metal foam material and/or comprises a metallic perforated or lattice structure.

Filter Structure in the Hollow Space

Aspect 62. The particle separating system according to any one of Aspects 46 to 52 and 59 to 61, wherein the particle separator (20; 30; 50) comprises a filter structure (22; 32; 62) which is arranged in the hollow space (7; 37, 39; 67), and the filter structure (22; 32; 62) comprises a filter medium (23; 33; 63) which extends around the rotational axis (R) of the hollow space (7; 37, 39; 67) and which the engine lubricating oil can flow through and which surrounds at least a part of an interior space of the filter and is surrounded by a hollow space volume (9; 37, 39; 67), wherein the filter structure (22; 32; 62) is arranged and embodied such that engine lubricating oil which flows into the hollow space volume (9; 37, 39; 67) flows through the filter medium (23; 33; 63) and flows off through the interior space of the filter.

Aspect 63. The particle separating system according to the preceding aspect, wherein the filter structure (22; 32) corresponds to any one of Aspects 21, 22 and 29 to 45.

Aspect 64. The particle separating system according to any one of the immediately preceding two aspects in combination with Aspect 20 or 47, wherein the centrifugal force separator (21; 28; 31; 51) is arranged upstream of the filter structure (22; 32; 62).

Aspect 65. The particle separating system according to any one of the immediately preceding three aspects in combination with Aspect 20 or 47, wherein the filter structure (22) protrudes axially into or through the centrifugal force separator (21; 28), and a hollow volume (9) remains radially between the filter structure (22) and the centrifugal force separator (21; 28), in which the engine lubricating oil can flow around an outer circumference of the filter medium (23; 33).

Aspect 66. The particle separating system according to any one of the immediately preceding four aspects in combination with Aspect 20 or 47, wherein at least a majority of the axial length of the filter structure (32; 62) is arranged outside the centrifugal force separator (31; 51).

Absorbing Pockets

Aspect 67. The particle separating system according to any one of the preceding aspects in combination with Aspect 20 or 47, wherein the centrifugal force separator (28) comprises absorbing pockets (29) for particles on an outer circumferential wall of the hollow space (7).

Aspect 68. The particle separating system according to the preceding aspect, wherein the absorbing pockets for trapping the particles are undercut and open in a tangential direction.

Displacement Body

Aspect 69. The particle separating system according to any one of the preceding aspects in combination with Aspect 46, wherein a displacement body is provided in the hollow space, such that an annular volume which the lubricating oil can flow through is obtained in the hollow space and surrounded on the radially inner side by the displacement body and on the radially outer side by a circumferential wall of the body which forms the hollow space, wherein said circumferential wall surrounds the displacement body.

Aspect 70. The particle separating system according to the preceding aspect in combination with Aspect 20 or 47, wherein the centrifugal force separator or at least an axial partial portion of the centrifugal force separator surrounds the displacement body or at least an axial partial portion of the displacement body.

Cyclone Separator

Aspect 71. The particle separating system according to any one of the preceding aspects, wherein the particle separator comprises a cyclone separator (40), and the cyclone separator (40) comprises: a vortex portion (47*a*) exhibiting a cyclone axis (Z) and comprising an inlet (48) for an inflow of the engine lubricating oil with a tangential directional component with respect to the cyclone axis (Z); an axial separating portion (47*c*), connected to the vortex portion (47*a*), for absorbing particles flowing axially in the vortex portion (47*a*) towards the separating portion (47*c*); and an outlet (49) for the lubricating oil.

Aspect 72. The particle separating system according to the preceding aspect, wherein the cyclone axis (Z) extends through the separating portion (47*c*), and a circumference of the separating portion (47*c*) which extends around the cyclone axis (Z) is lined with an open-pored absorbing medium (46) for the particles, for example a fleece material and/or a fabric material.

Aspect 73. The particle separating system according to the preceding aspect, wherein the absorbing medium (46) contains a fibrous material, for example a fleece material, and/or metallic fabric material and/or metallic mesh and/or an open-pored foam material and/or comprises a perforated or lattice structure.

Aspect 74. The particle separating system according to the preceding aspect, wherein the absorbing medium (46) contains sintered metallic fibrous material and/or metallic fabric material and/or metallic mesh and/or an open-pored metal foam material and/or comprises a metallic perforated or lattice structure.

Aspect 75. The particle separating system according to any one of the immediately preceding four aspects, wherein a pressure storage for the lubricating oil, which is arranged upstream of the cam shaft phase adjuster (10), forms the cyclone separator (40).

Aspect 76. The particle separating system according to the preceding aspect, wherein the pressure storage comprises a piston (43) which can be moved in the vortex portion (47*a*) counter to an elastic restoring force and delineates the vortex portion (47*a*) and forms the separating portion (47*c*).

Aspect 77. The particle separating system according to any one of the immediately preceding six aspects, wherein the vortex portion (47*a*) is connected to the separating portion (47*c*) via a funnel portion (47*b*), and the funnel portion (47*b*) tapers towards the separating portion (47*c*).

Centrifugal Force Separator Comprising an Annular Gap

Aspect 78. The particle separating system according to any one of the preceding aspects, wherein:
the engine lubricating oil can be fed to the cam shaft phase adjuster (10) through a hollow space (57) which extends around a rotational axis (R) and is delineated on the radially inner side by a first body (6) and on the radially outer side by a second body (56) which surrounds the first body (6);
at least one of the bodies (6, 56) can be rotary-driven about the rotational axis (R) absolutely and relative to the other body (56, 6);
the hollow space (57) forms and/or contains a centrifugal force separator (51) for absorbing particles entering the centrifugal force separator (51) due to centrifugal force;
and an annular gap (55) remains between the first body (6) and the second body (56) downstream of the centrifugal force separator (51), wherein the annular gap (55) extends around the rotational axis (R) and delineates the hollow space (57), and the lubricating oil has to flow through the annular gap (55) on its way to the cam shaft phase adjuster (10).

Aspect 79. The particle separating system according to the preceding aspect, wherein the cam shaft (6) forms the first body.

Aspect 80. The particle separating system according to the preceding aspect, wherein a bearing body (56) for rotary-mounting the cam shaft (6) forms the second body.

Magnetic Separator

Aspect 81. The particle separating system according to any one of the preceding aspects, wherein the particle separator (20; 30; 40; 50; 80) comprises magnetic material for trapping ferritic particles.

Aspect 82. The particle separating system according to the preceding aspect, wherein the filter medium (23; 33; 63) of the filter structure (22; 32; 62) according to any one of Aspects 21, 22, 29 to 44 and 55 to 59 contains magnetic material for trapping ferritic particles.

Aspect 83. The particle separating system according to any one of the immediately preceding two aspects, wherein the absorbing medium or an absorbing structure (28, 29) of the centrifugal force separator or cyclone separator (21; 28; 31; 40; 51; 81) according to any one of Aspects 20 and 44 to 74 contains magnetic material for trapping ferritic particles.

Aspect 84. The particle separating system according to any one of the preceding aspects in combination with any one of Aspects 17 to 28, wherein the particle separator (20; 30; 40; 50; 80) comprises a ferrite separator which comprises magnetic material for trapping ferritic particles, and the ferrite separator forms an additional separating stage which is arranged upstream of a different separating stage (21, 22; 22, 28; 31, 32; 40; 51; 62; 81) of the particle separator in the flow direction of the lubricating oil.

Phase Adjuster with Internal Lubricating Oil Drainage

Aspect 85. A phase adjuster for adjusting the rotational angular position of a cam shaft (6) relative to a crankshaft of an internal combustion engine, the phase adjuster comprising:
(a) a stator (11) which can be rotary-driven;
(b) a rotor (12) which is or can be connected to the cam shaft (6);
(c) a pressure chamber for hydraulically adjusting the rotational angular position of the rotor (12) relative to the stator (11) by applying pressure to the rotor (12) using engine lubricating oil as a pressure medium; and
(d) a control valve (13-19) for hydraulically adjusting the rotational angular position of the rotor (12) relative to the stator (11);
(e) said control valve (13-19) comprising:
(e1) a valve housing (13) comprising a pressure port (84) for feeding the engine lubricating oil, a working port (A, B) which is connected to the pressure chamber, and a tank port (T) for draining the engine lubricating oil;
(e2) and a valve piston (14) which can be moved back and forth in a hollow space of the valve housing (13) between a first control position and a second control position;
(f) wherein the working port (A, B) is connected to the pressure port (84) in the first control position and separated from the pressure port (84) and connected to the tank port (T) in the second control position;
(g) and wherein the working port (A, B) is connected to the tank port (T) in the second control position by a hollow space of the valve piston (14).

Aspect 86. The phase adjuster according to the preceding aspect, wherein the tank port (T) feeds into the hollow space of the valve housing (13) axially opposite the valve piston (14).

Aspect 87. A phase adjuster for adjusting the rotational angular position of a cam shaft (6) relative to a crankshaft of an internal combustion engine, the phase adjuster comprising:
(a) a stator (11) which can be rotary-driven;
(b) a rotor (12) which is or can be connected to the cam shaft (6);
(c) a pressure chamber for hydraulically adjusting the rotational angular position of the rotor (12) relative to the stator (11) by applying pressure to the rotor (12) using engine lubricating oil as a pressure medium; and
(d) a control valve (13-19) for hydraulically adjusting the rotational angular position of the rotor (12) relative to the stator (11);
(e) said control valve (13-19) comprising:
(e1) a valve housing (13) comprising a pressure port (84) for feeding the engine lubricating oil, a working port (A, B) which is connected to the pressure chamber, and a tank port (T) for draining the engine lubricating oil;
(e2) and a valve piston (14) which can be moved back and forth in a hollow space of the valve housing (13) between a first control position and a second control position;
(f) wherein the working port (A, B) is connected to the pressure port (84) in the first control position and separated from the pressure port (84) and connected to the tank port (T) in the second control position;
(g) and wherein the tank port (T) feeds into the hollow space of the valve housing (13) axially opposite the valve piston (14).

Aspect 88. The phase adjuster according to the preceding aspect, wherein the working port (A, B) is connected to the tank port (T) in the second control position by a hollow space of the valve piston (14).

Aspect 89. The phase adjuster according to any one of the immediately preceding four aspects, wherein the tank port (T) is permanently connected to the hollow space of the valve piston (14).

Aspect 90. The phase adjuster according to any one of the immediately preceding five aspects, wherein the tank port (T) extends from an axial end face of the valve housing (13) up to and into the hollow space of the valve housing (13).

Aspect 91. The phase adjuster according to any one of the immediately preceding six aspects, wherein the tank port (T) feeds into the hollow space of the valve housing (13) axially facing the hollow space of the valve piston (14).

Aspect 92. The phase adjuster according to any one of the immediately preceding seven aspects, wherein:
the pressure chamber forms a leading chamber, and the rotor (12) is adjusted relative to the stator (11) in a leading direction when pressure is applied to the leading chamber;
the phase adjuster (10) comprises an additional pressure chamber which forms a trailing chamber, and the rotor (12) is adjusted relative to the stator (11) in a trailing direction, counter to the leading direction, when pressure is applied to the trailing chamber;
the working port (A) is connected to the leading chamber;
the valve housing (13) comprises an additional working port (B) which is connected to the trailing chamber;
the additional working port (B) is connected to the pressure port (84) in the second control position and separated from the pressure port (84) and connected to the same tank port (T) in the first control position.

Aspect 93. The phase adjuster according to any one of the immediately preceding eight aspects, wherein the tank port (T) is connected to a hollow space (7) of the cam shaft (6), for draining the engine lubricating oil.

Aspect 94. The phase adjuster according to any one of the immediately preceding nine aspects, wherein the tank port (T) is connected to an outflow portion (69) of a filter structure (62) comprising a filter medium (63) which extends around the outflow portion (69) and which the engine lubricating oil flows through when the engine lubricating oil flows to the pressure port (84) of the control valve (13-19).

Aspect 95. The phase adjuster according to any one of the immediately preceding ten aspects, comprising a belt drive, which runs dry with no engine lubricating oil, for rotary-driving the stator (11).

Aspect 96. The phase adjuster according to any one of the immediately preceding eleven aspects, comprising: a drive wheel which cannot be rotated relative to the stator (11) and which can be formed by the stator (11); and a belt which encloses the drive wheel, wherein the phase adjuster (10) is sealed off against the escape of engine lubricating oil by means of shaft sealing rings (75, 76; 89) on both sides of the stator (11), such that the belt revolves dry with no engine lubricating oil.

Aspect 97. The phase adjuster according to any one of the immediately preceding twelve aspects, wherein the phase adjuster (10) forms the phase adjuster (10) mentioned in Aspects 1 to 84.

BRIEF DESCRIPTION OF THE DRAWINGS

The invention is described below on the basis of example embodiments. Features disclosed by the example embodiments advantageously develop the subject-matter of the claims, the subject-matter of the aspects and also the embodiments described above. There is shown:

FIG. 1 a lubricating oil cycle comprising a particle separating system in accordance with the invention;

FIG. 2 a particle separating system comprising multiple particle separators for a system of multiple phase adjusters;

FIG. 3 a particle separating system comprising one particle separator for multiple phase adjusters;

DETAILED DESCRIPTION OF THE INVENTION

Figure 4:
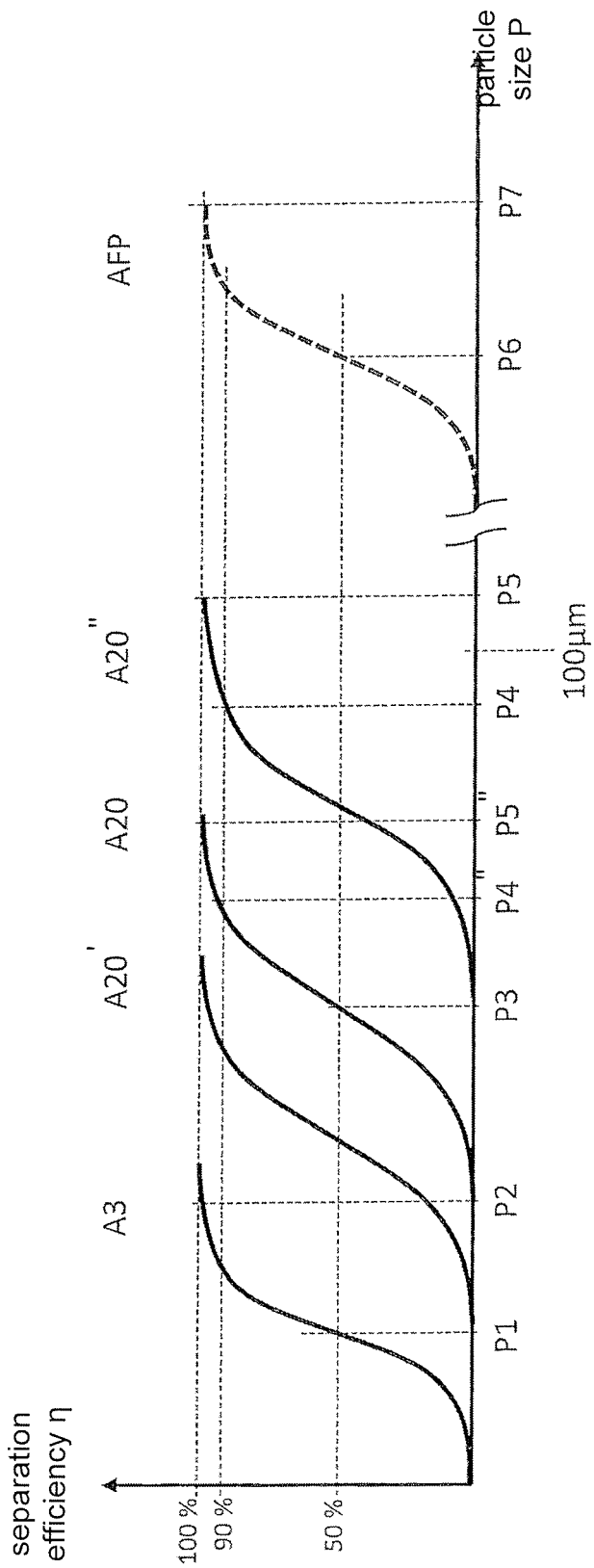
FIG. 4 separation curves of a main oil separator and an additional particle separator of the particle separating system.

FIG. 1 shows a lubricating oil cycle for supplying an internal combustion engine with engine lubricating oil. The lubricating oil cycle comprises a lubricating oil reservoir S and a lubricating oil pump 1 which delivers engine lubricating oil from the lubricating oil reservoir S to consumption points $5_i$ via a lubricating oil gallery 5, in order for example to lubricate a consumption point $5_i$ and to cool, for example by means of spray cooling, and as applicable likewise lubricate a consumption point $5_n$. Once it has lubricated and/or cooled the relevant consumption point $5_i$, the lubricating oil flows back into the lubricating oil reservoir S.

A cam shaft phase adjuster 10, referred to in the following as the phase adjuster 10, or a system of multiple phase adjusters 10 adjoins the lubricating oil cycle as an additional lubricating oil consumer. The engine lubricating oil serves as a pressure medium for the respective phase adjuster 10 for adjusting the phase position of a cam shaft, which is assigned to the respective phase adjuster, relative to a crankshaft of the internal combustion engine. The pump 1 delivers the lubricating oil to the consumption points $5_i$ and the phase adjuster(s) 10 via a cooler 2 and a main oil separator 3, as is common in motor vehicles. A secondary flow oil separator, which can in particular be configured for separating soot particles, is denoted by 4.

A particle separating system which is integrated into the lubricating oil cycle of the internal combustion engine ensures very reliably that lubricating oil from which damaging or acutely compromising dirt particles have to the greatest possible extent been removed is fed to the phase adjuster 10 as a pressure medium. The whole of the delivery flow of the lubricating oil pump 1 is delivered through the main oil separator 3 before the lubricating oil reaches the individual consumption points $5_i$ and the phase adjuster 10 via the lubricating oil gallery 5. Dirt particles down to particle sizes of 50 µm and smaller are separated in the main oil separator 3. The lubricating oil at the outlet of the main oil separator 3, which has been cleaned in the main oil separator 3, therefore at least substantially only then exhibits dirt particles smaller than 50 µm. Main oil separators 3 such as are common in motor vehicles achieve a separation efficiency of 90% and higher at particle sizes in the range of 30 µm to 40 µm. The main oil separator 3 therefore comprises one or more correspondingly fine separating devices.

Because of the drop in pressure associated with cleaning, a bypass valve 3a is provided in order to deliver the lubricating oil past the main oil separator 3, and thus unfiltered, to the consumption points $5_i$ when the engine is still cold, i.e. during a cold start. The bypass valve 3a protects the main oil separator 3 from being destroyed by the particularly high pressure at the outlet of the lubricating oil pump 1 when cold. Once the lubricating oil has been sufficiently heated by the operation of the internal combustion engine, the bypass valve 3a closes and the lubricating oil flows through the main oil separator 3 to the consumption points $5_i$ and the phase adjuster 10.

In FIG. 1, the consumption points $5_i$ and the phase adjuster 10 are arranged in parallel in relation to the lubricating oil flow, such that the lubricating oil flows from the main oil separator 3 up to the respective consumption point $5_i$ and the phase adjuster 10, respectively, through only the essential feed conduits. In principle, a consumption point $5_i$ can however also be arranged upstream of the phase adjuster 10. It is equally possible for a consumption point $5_i$ to be arranged downstream of the phase adjuster 10, such that the lubricating oil is fed to the phase adjuster 10 via the upstream consumption point $5_i$ and/or fed back into the lubricating oil reservoir S from the phase adjuster 10 via the downstream consumption point $5_i$.

In addition to the main oil separator 3, a particle separator 20 is provided in the lubricating oil feed to the phase adjuster 10, in order to increase the likelihood, as compared with known separating systems, with which it is ensured that malfunctions due to dirt particles and in principle also frictional wear on the phase adjuster 10 no longer occur. The particle separator 20 is thus arranged downstream of the main oil separator 3 and upstream of the phase adjuster 10. The particle separator 20 can in particular be arranged immediately upstream of the phase adjuster 10, such that the lubricating oil from which potentially damaging dirt particles have to the greatest possible extent been removed by the particle separator 20 is directly available to the phase adjuster and does not flow to the phase adjuster 10 indirectly via long feed conduits or even an interposed consumption point.

The particle separator 20 is arranged at least in part upstream of the phase adjuster 10. This means that at least some of the particle separator 20 is arranged upstream of a pressure port of the phase adjuster 10. If the particle separator 20 comprises multiple separating stages which are connected successively in relation to the flow direction of the lubricating oil, at least one of the separating stages is arranged upstream of the pressure port of the phase adjuster 10. A separating stage or some of a separating stage of a multi-stage particle separator 20 can in principle be arranged in the phase adjuster 10 and for example protrude through the pressure port of the phase adjuster 10 into a control valve of the phase adjuster 10; expediently, however, the particle separator 20 is arranged entirely outside the phase adjuster 10. Arranging it at least in part and preferably entirely outside the phase adjuster 10 enables the particle separator 20 to be configured independently of restrictions which filter screens which are conventionally arranged in phase adjusters are subject to due to the very limited installation spaces available in phase adjusters. This opens up hitherto unused scope for configuring the particle separator 20 in accordance with the separating properties of the main oil separator 3 which likewise forms part of the particle separating system.

FIG. 2 shows a system of multiple phase adjusters 10 which are each assigned a particle separator 20 of their own. The statements made above with respect to FIG. 1 apply to each pair consisting of a phase adjuster 10 and an assigned particle separator 20. The phase adjusters 10 and particle separators 20 of FIG. 2 can substitute for the phase adjuster 10 and particle separator 20 in FIG. 1. Two phase adjusters 10 and correspondingly two particle separators 20 are shown by way of example in FIG. 2. If the internal combustion engine comprises more than two cam shafts which can be adjusted in terms of their rotational angular position, and correspondingly more than two phase adjusters 10, then each of the phase adjusters 10 in a correspondingly extended system of phase adjusters 10 can be assigned a particle separator 20 of its own, as shown in FIG. 2 for two phase adjusters 10 only.

FIG. 3 shows a system of multiple phase adjusters 10 which, unlike the system in FIG. 2, is only assigned one, shared particle separator 20. The system shown comprises two phase adjusters 10 only. If the system comprises more than two phase adjusters 10, then the three or more phase adjusters 10 can be supplied with the lubricating oil which has been cleaned by the shared particle separator 20. The system of phase adjusters 10 comprising the shared particle separator 20 can substitute for the phase adjuster 10 and particle separator 20 in the lubricating oil cycle of FIG. 1.

If a system of phase adjusters 10 comprises three or more phase adjusters 10, hybrid forms of the arrangements shown in FIGS. 2 and 3 are also possible with regard to supplying the phase adjusters with cleaned lubricating oil. If there are for example three phase adjusters 10, then two phase adjusters 10 can be supplied via a shared particle separator 20, as in FIG. 3, and the third phase adjuster 10 can be supplied via a particle separator 20 of its own which is only assigned to that phase adjuster, as in FIG. 2. If there are four phase adjusters 10, each two of these phase adjusters 10 can for example be combined to form a group, as in FIG. 3, and respectively supplied with the cleaned lubricating oil via a shared particle separator 20.

FIG. 4 shows the separation curve A3 of the main oil separator 3, separation curves A20, A20' and A20" for one particle separator 20 each and, for comparison, the separation curve AFP of a filter screen such as is typically arranged in the phase adjuster in the prior art. The separation curves show the separation efficiency as a percentage against the particle size P at which the respective separation efficiency is achieved, i.e. as a function of P. In relation to the separation curve A3, this means that the main oil separator 3 exhibits a separation efficiency of 50% for dirt particles of the particle size P1 and a separation efficiency of almost 100% for dirt particles of the size P2. If lubricating oil flows through the main oil separator 3 when the internal combustion engine is at its operating temperature, 50% of the particles of particle size P1 contained in the lubricating oil and almost 100% of the particles of particle size P2 will be trapped in the main oil separator 3, while 50% of the particles of particle size P1 and a higher percentage of even smaller particles will flow through the main oil separator 3 and enter the lubricating oil gallery 5 (FIG. 1). The particle size P1 can for example be in the range of 10 μm to 20 μm and in particular in the range of 12 μm to 15 μm. The particle size P2 can for example be in the range of 30 μm to 50 μm and in particular in the range of 30 μm to 40 μm. This corresponds to the separation efficiencies of main oil separators 3 such as are common in motor vehicle manufacturing.

The separation curves A20, A20' and A20" show ways of attuning the particle separator 20 to the separating properties of the main oil separator 3.

The separation curve A20' overlaps with the separation curve A3. If the particle separator 20 exhibits the separation curve A20', even very small dirt particles which flow through the main oil separator 3 will therefore be separated to a measurable extent in the particle separator 20. An appreciable separation takes effect even for particles having a particle size which is between P1 and P2.

The separation curve A20" is offset some way from the separation curve A3. This means that a particle separator 20 which exhibits the separation curve A20" will only separate dirt particles to a measurable extent at or above a particle size which is above the particle size P2. Separation can for example take effect in such a particle separator 20 only at or above a particle size of 60 μm or 70 μm, while a separation efficiency of 90% is achieved at a particle size of P4", where P4"<100 μm, for example at P4"=90 μm.

Configuring the particle separator 20 in accordance with the separation curve A20 is particularly favourable with a view to protecting the assigned phase adjuster 10 or assigned system of phase adjusters 10 as effectively as possible on the one hand, and operating without the need for maintenance and for as long a service life as possible on the other. In the case of a particle separator 20 exhibiting the separation curve A20, a measurable separation of dirt particles takes effect immediately at or above the particle size P2. The separation curve A20 does not overlap with the separation curve A3 of the main oil separator 3, or not measurably in standard test procedures, but does begin directly at or at least near to the particle size P2 at which the main oil separator 3 achieves a separation efficiency of at least 90% or more preferably almost 100%. The particle separator 20 achieves a separation efficiency of 90% at a particle size P4 of less than 100 µm and a separation efficiency of almost 100% for particles of a mean particle size P5>P4. The particle size P4 at which the particle separator 20 exhibits a separation efficiency of 90% is advantageously less than 90 µm and can in particular be less than 80 µm. Using the separation curve A20, the particle separator 20 already achieves a separation efficiency of almost 100%, such as for example 97%, for particles of the particle size P5 which is smaller than the mean particle size P4" of a particle separator 20 which is coarser in accordance with the separation curve A20" but still in accordance with the invention. A separation efficiency of 50% is achieved in all three cases only at a particle size P3, where P3>P2. For reasons of space, the particle sizes of the $\eta_{3,50}$ separation efficiencies are not indicated for the separation curves A20' and A20".

The particle separator 20 is particularly suitable for keeping original dirt, still present in the lubricating oil cycle from the production of the internal combustion engine, away from the one or more phase adjusters 10. Original dirt is formed for example by sand and corundum particles still left over from die-casting parts of the engine block and/or from blast-treating parts of the engine in the region of the conduits which guide lubricating oil. During the running-in period of the engine, original dirt can reach the one or more phase adjusters 10 if it were not effectively separated by the one or more particle separators 20. Original dirt can also in principle become detached even after longer periods of operation and, if a particle separator 20 is not provided, can reach the one or more phase adjusters 10 before it is separated in the main oil separator 3. Dirt particles of a potentially damaging particle size can also above all enter the lubricating oil cycle during cold start phases of the internal combustion engine, specifically when the bypass valve 3a is open and the lubricating oil pump 1 therefore delivers the lubricating oil to the lubricating oil gallery 5 by bypassing the main oil separator 3. Other causes for the introduction of comparatively large dirt particles include repair work on components of the internal combustion engine which come into contact with the lubricating oil, and also changing the main oil separator 3, as is routinely done once the service life envisaged for the main oil separator 3 has been reached. Conversely, since the particle separator or separators 20 achieve a separation efficiency of 50% ($\eta_{3,50}$) only at a mean particle size P3, which is larger than the particle size P1 and preferably larger than the particle size P2 for the 90% ($\eta_{3,90}$) separation efficiency of the main oil separator 3, this counters the danger of the particle separator 20 becoming blocked.

As shown by the separation curve AFP indicated for comparison purposes in the diagram of FIG. 4, the filter screens hitherto used for phase adjusters, which are respectively arranged in the phase adjuster, only achieve separation efficiencies of 50%, 90% and almost 100% for dirt particles having particle sizes between P6 and P7 which are significantly above 100 µm and typically even above 200 µm. The particle separating system of the invention can comprise a particle separator in the respective phase adjuster 10, although this is not required since the particle separator 20, which is advantageously arranged near or preferably immediately on the phase adjuster 10, ensures more effective particle separation.

Figure 5:
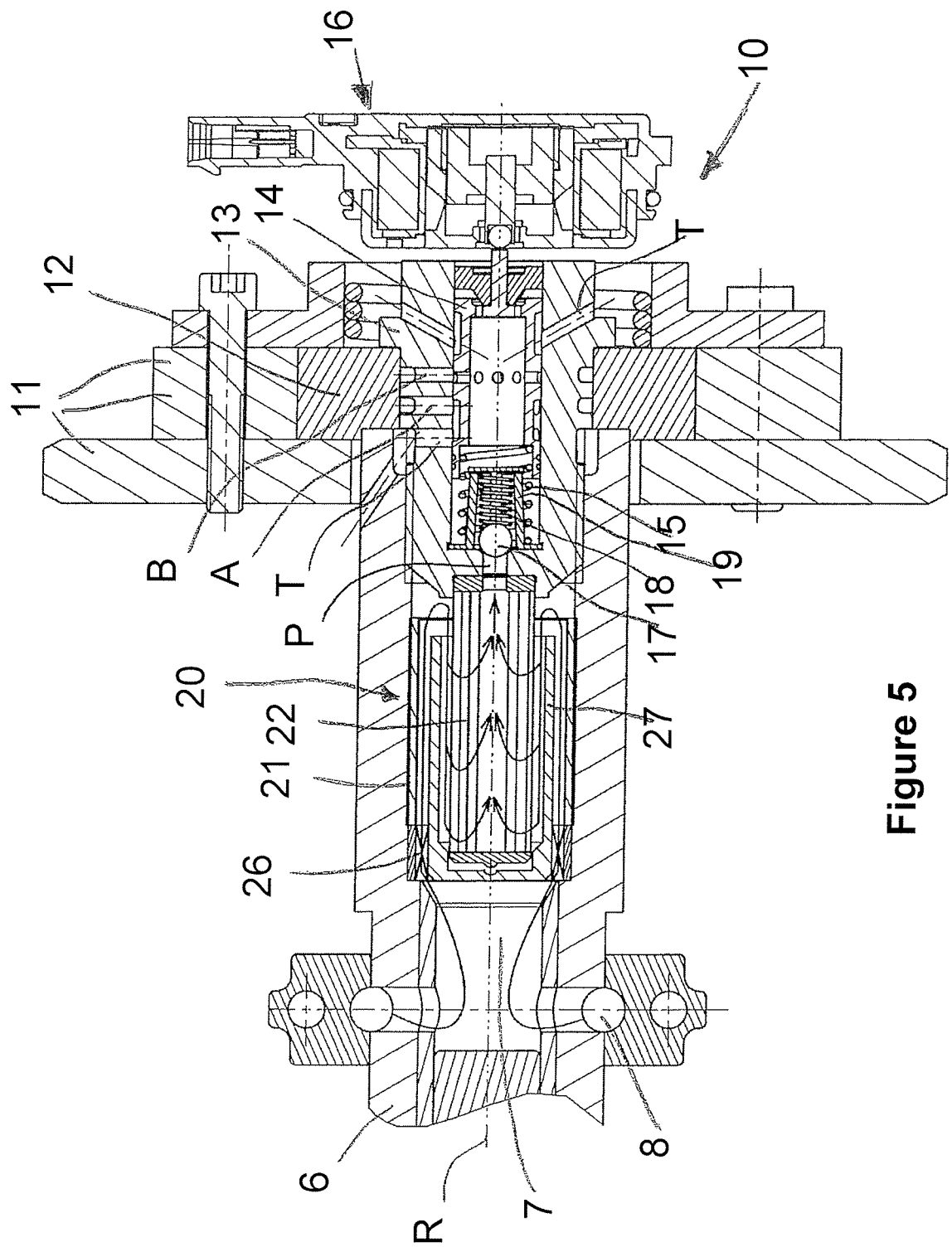
FIG. 5 a phase adjuster comprising a particle separator of a first example embodiment.

FIG. 5 shows a phase adjuster 10 and a particle separator 20 which is assigned to said phase adjuster 10 only, such as are shown schematically in FIGS. 1 and 2. The phase adjuster 10 comprises a stator 11, which is driven by a crankshaft of the internal combustion engine in a fixed rotational speed relationship to the crankshaft, and a rotor 12 which is non-rotationally connected to a cam shaft 6. The stator 11 surrounds the rotor 12 over its outer circumference. The stator 11 and the rotor 12 can be rotated about the rotational axis R of the cam shaft 6, wherein the rotor 12 can be moved back and forth within a predetermined rotational angular range relative to the stator 11 in a leading direction and in a trailing direction counter to the leading direction, in order to be able to adjust the rotational angular position of the cam shaft 6 relative to the crankshaft.

The phase adjuster 10 is embodied as a vane motor. Correspondingly, one or more vanes protrude/s radially inwards from the inner circumference of the stator 11, while one or more vanes project radially outwards from the outer circumference of the rotor 12, such that a pressure chamber into which the lubricating oil can be introduced as a pressure medium is respectively formed between a vane of the stator 11 and a vane of the rotor 12 which is adjacent in the circumferential direction. At least two such pressure chambers are formed in the phase adjuster 10, namely one pressure chamber for adjusting the rotor in one rotational direction and another pressure chamber for adjusting in the other rotational direction, such that the rotor 12 can be selectively adjusted to either lead or trail relative to the stator 11. The stator 11 and the rotor 12 can in particular each comprise multiple vanes which co-operate in this way, such that multiple pressure chambers for adjusting in the leading direction and multiple pressure chambers for adjusting in the trailing direction are formed between the stator 11 and the rotor 12 in a distribution about the rotational axis R.

The phase adjuster 10 comprises a control valve featuring a valve housing 13 and a valve piston 14 which can be moved back and forth in the valve housing 13 between control positions. A spring force is applied to the valve piston 14 by a valve spring 15 in one direction in which it can be moved, and the valve piston 14 can be moved in the opposite direction, counter to the elastic restoring force of the valve spring 15, by means of an electromagnetic device 16.

The control valve comprises a pressure port P, a working port A, a working port B and at least one tank port T—in the example embodiment, two tank ports T. The control valve adjoins the lubricating oil cycle at the pressure port P, such that pressurised lubricating oil can flow through the pressure port P into the control valve and thus into the phase adjuster 10. One of the working ports A and B is connected to the pressure chamber or chambers for adjusting the rotor 12 in the leading direction, and the other of the working ports A and B is connected to the pressure chamber or chambers for adjusting the rotor 12 in the trailing direction. Depending on the control position of the valve piston 14, the pressure port P is connected to either the working port A or the working port B, such that the pressurised lubricating oil flows via the relevant working port A or B into the assigned pressure chamber(s) and the rotor 12 is adjusted relative to the stator 11 in the corresponding rotational direction. The other of the working ports A and B is simultaneously connected to one of the tank ports T, such that the lubricating oil can flow off via said other working port A or B and the assigned tank port T to the lubricating oil reservoir S (FIG. 1) and the assigned pressure chamber(s) is/are relieved of pressure.

The control valve is embodied as a so-called central valve, i.e. it protrudes centrally in the axial direction into the rotor 12. The valve housing 13 simultaneously serves to non-rotationally connect the rotor 12 to the cam shaft 6. In order to perform this function, it protrudes through the rotor 12 towards a fitting end of the cam shaft 6 and is fixedly connected to the cam shaft 6, for example screwed or pressed onto the cam shaft 6, in the region of the fitting end.

A reflux valve is arranged between the pressure port P and the working ports A and B in the valve housing 13. The reflux valve comprises a blocking member 17, a blocking member spring 18 and a support structure 19. The blocking member 17 can in particular be a sphere. The blocking member spring 18 acts on the blocking member 17 in the direction of a blocking position in which it seals the pressure port P, such that lubricating oil is prevented from flowing back towards the particle separator 20. When a certain minimum pressure is reached, the blocking member 17 is lifted off its seating, such that lubricating oil can flow into the control valve and, depending on the control position of the valve piston 14, via either the working port A or the working port B into the respectively assigned pressure chamber(s). The opposite end of the blocking member spring 18 to the blocking member 17 is supported on the support structure 19. The support structure 19 is held in the valve housing 13 in a positive fit by means of a locking connection.

Other details of the design and also other details of the functionality of the phase adjuster 10 are described in EP 2 578 818 B1 and also in U.S. Pat. No. 9,021,997 B2, which are each incorporated by reference. Reference is made to these documents with regard to advantageous embodiments of the phase adjuster 10.

The particle separator 20 is arranged upstream of the phase adjuster 10 and completely outside the phase adjuster 10, albeit in the immediate vicinity of the phase adjuster 10, specifically directly on the pressure port P of the phase adjuster 10. The particle separator 20 is arranged in a hollow space 7 of the cam shaft 6. The lubricating oil is correspondingly fed to the phase adjuster 10 through the cam shaft 6, specifically through the hollow space 7. More precisely, the hollow space 7 is formed in the end portion of the cam shaft 6 to which the phase adjuster 10 is fastened by means of the valve housing 13. This enables the particle separator 20 to be arranged as near as possible to the phase adjuster 10.

Figure 6:
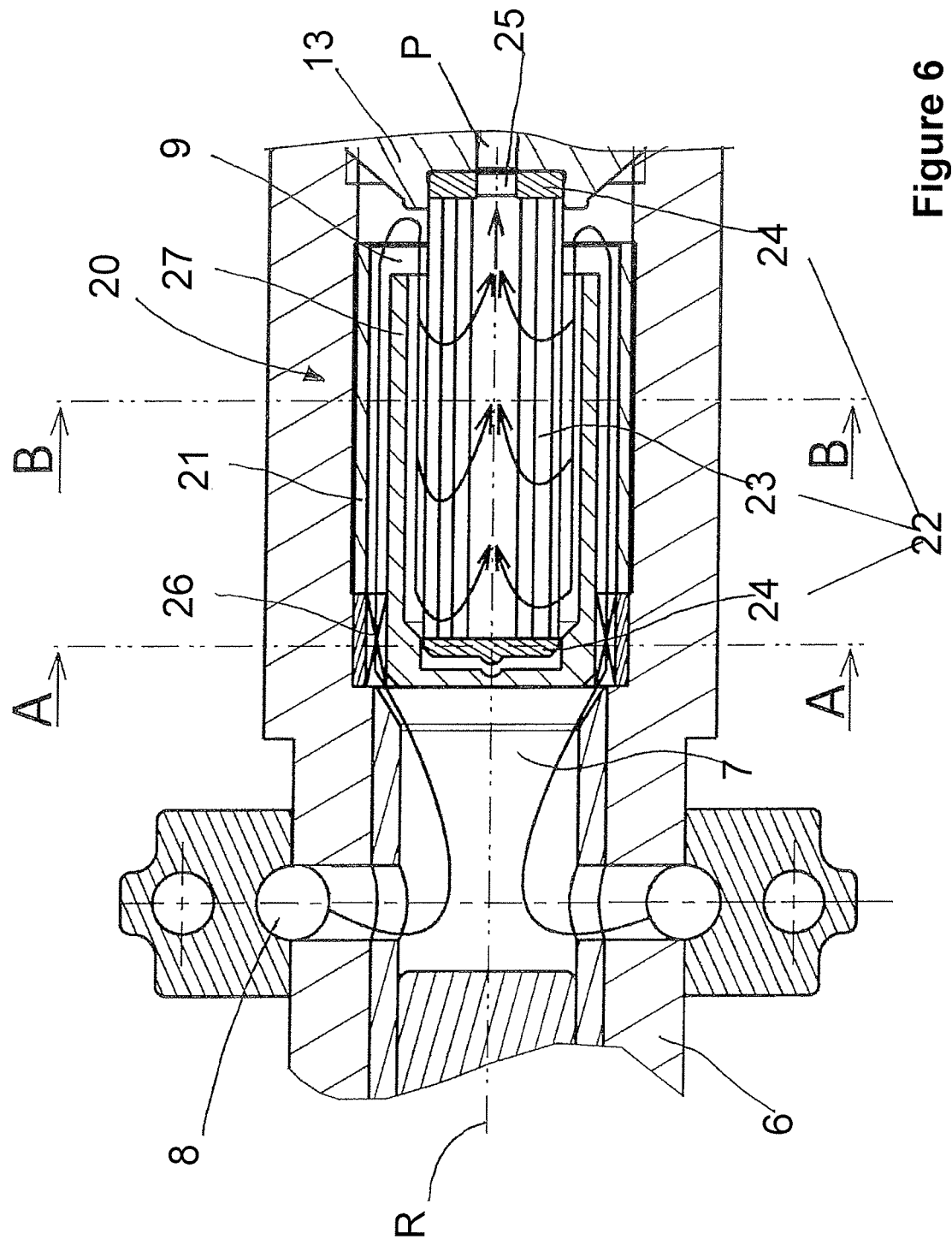
FIG. 6 the particle separator of FIG. 5 in an enlarged representation.

FIG. 6 shows the end portion of the cam shaft 6 which is used for fitting the phase adjuster 10, together with the particle separator 20 arranged in it, in an enlarged representation.

The particle separator 20 comprises an upstream first separating stage 21 and a second separating stage 22 which is downstream in relation to the flow direction of the lubricating oil, wherein the lubricating oil flows through the separating stages one after the other before it can enter the control valve and thus the phase adjuster 10 through the pressure port P. The first separating stage 21 is a centrifugal force separator in which dirt particles contained in the lubricating oil are separated due to centrifugal force. The second separating stage 22 is formed as a filter structure comprising a filter medium 23 for the lubricating oil. The lubricating oil has to flow through the filter medium 23 on its way to the phase adjuster 10.

The lubricating oil flows into the hollow space 7 via an inlet 8. When the internal combustion engine is in operation, the cam shaft 6 rotates about the rotational axis R which is simultaneously also a central longitudinal axis of the hollow space 7. The lubricating oil is set in rotational motion about the rotational axis R in the hollow space 7 due to the rotational movement of the cam shaft 6. In order to amplify the rotational movement, the inlet 8 is embodied such that the lubricating oil flows into the hollow space 7 with a directional component which is tangential to the rotational axis R, wherein the inflow direction points in the rotational direction of the cam shaft 6. An annular gap can be formed between the cam shaft 6 and a body, for example a bearing body, which surrounds the cam shaft 6, wherein one or more inlet channels exhibiting a tangential directional component lead/s inwards from the annular gap up to one or more inlet openings which feed/s into the hollow space 7. Immediately upstream of the annular channel, a non-rotating oil feed channel can already feed, tangentially to the rotational axis R, into the annular channel, wherein this upstream feed channel expediently feeds into the annular channel in the rotational direction of the cam shaft 6. The lubricating oil thus obtains a rotational impulse even as it flows into the annular channel, is swept along by the rotating cam shaft 6 in the annular channel and is guided into the hollow space 7, likewise with a tangential directional component, in the inlet region of the cam shaft 6 between the annular channel and the inlet openings.

A deflecting structure 26 which is arranged upstream of the first separating stage 21 in the hollow space 7 deflects the lubricating oil again with a directional component which points tangentially to the rotational axis R, in the same direction as the rotational direction of the cam shaft 6, thus further increasing the rotational velocity of the lubricating oil flow in the hollow space 7. The rotational velocity of the lubricating oil flow immediately after it flows into the hollow space 7 or through the deflecting structure 26 is advantageously greater than the rotational velocity of the cam shaft 6, such that the lubricating oil flow is faster than the cam shaft 6 in the rotational direction.

Figure 7:
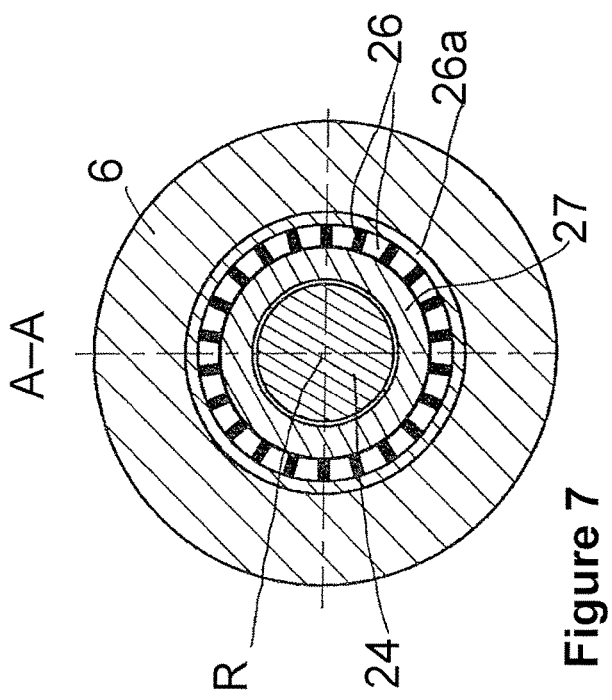
FIG. 7 the cross-section A-A from FIG. 5.

FIG. 7 shows the cross-section A-A from FIG. 6, i.e. it shows in particular the deflecting structure 26. The deflecting structure 26 comprises multiple plate-shaped, fin-shaped or bowl-shaped deflecting elements in a distribution about the rotational axis R, between which the lubricating oil can flow through the deflecting structure 26 in the axial direction, wherein it is deflected in the tangential direction. The deflecting elements, which are likewise denoted by 26 in FIG. 7, are arranged on and protrude radially inwards from a fitting ring 26a which is used for fastening in the hollow space 7.

As already mentioned, the first separating stage 21 is a centrifugal force separator. It comprises a sleeve-shaped absorbing medium which lines an inner circumferential wall of the hollow space downstream of the deflecting structure 26. Dirt particles are pressed outwards towards and into the absorbing medium of the centrifugal force separator 21 due to the centrifugal force acting on the lubricating oil. The absorbing medium is formed such that it traps the absorbed dirt particles at or above a certain particle size.

Figure 8:
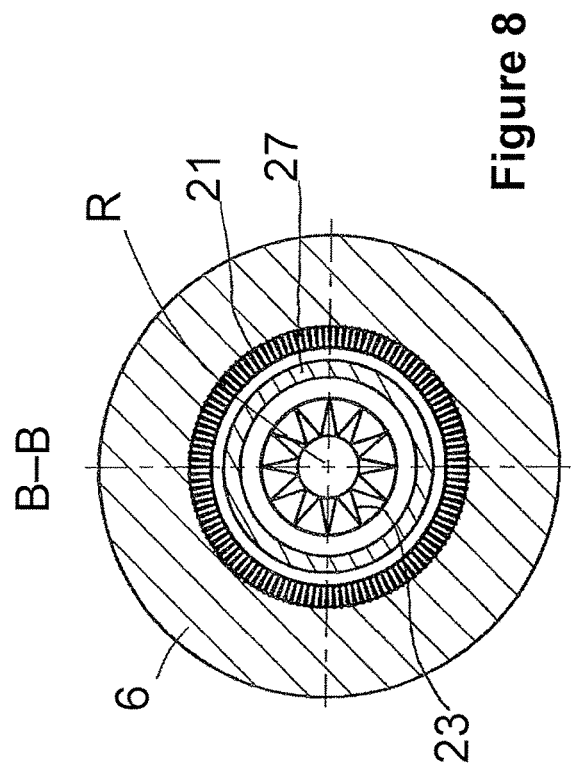
FIG. 8 the cross-section B-B from FIG. 5.

FIG. 8 shows among other things the filter structure 22, arranged downstream of the centrifugal force separator 21, in the cross-section B-B from FIG. 6. The filter structure 22 comprises a filter medium 23 which the lubricating oil can flow through, and a support structure 24 (FIGS. 6 and 7) which supports the filter medium 23 and is simultaneously also used for fitting the filter structure 22. The filter medium 23 is pleated, i.e. placed in folds around the circumference of the rotational axis R, in order to obtain as large a filter surface as possible. The filter medium 23 surrounds an axially elongated interior space of the filter which remains clear of filter material and through which the cleaned lubricating oil can flow off in the axial direction directly to the pressure port P. The support structure 24 forms an end region of the filter structure 22 which axially faces the pressure port P and an end region of the filter structure 22 which faces away from the pressure port P. The end region which faces the pressure port P comprises a filter outlet 25 as a central passage for the lubricating oil. The filter outlet 25 is in axial alignment with the pressure port P, such that the cleaned lubricating oil can flow off with very little resistance.

As can be seen in FIGS. 6 to 8, the two separating stages 21 and 22, i.e. the centrifugal force separator 21 and the filter structure 22, are arranged concentrically with respect to each other with the rotational axis R as a central filter axis. The filter medium 23 of the filter structure 22 protrudes axially into the centrifugal force separator 21; in the example embodiment, the filter medium 23 protrudes through the centrifugal force separator 21. In order for fluid to still flow through the separating stages 21 and 22 sequentially, a sleeve-shaped flow channelling structure 27 is arranged in the hollow space 7, wherein a side of the flow channelling structure 27 which faces the inlet 8 comprises a closed base, i.e. one which the lubricating oil cannot flow through, and the flow channelling structure 27 protrudes axially from said base into an annular hollow space volume 9 between the centrifugal force separator 21 and the filter structure 22 and, as is preferred but merely by way of example, as far as the vicinity of the downstream end of the centrifugal force separator 21.

The flow channelling structure 27 delineates the deflecting structure 26 radially inwards. As a result, the lubricating oil which flows through the inlet 8 into the hollow space is forced radially outwards by the flow channelling structure 27, such that it has to flow through the deflecting structure 26. Once it has flowed through the deflecting structure 26, the lubricating oil flows axially—and with a rotational movement superimposed on its axial movement—through an outer annular space which is delineated on the radially outer side by the centrifugal force separator 21 and on the radially inner side by the flow channelling structure 27, is deflected radially inwards towards the filter medium 23 at the end of the flow channelling structure 27, and due to its delivery pressure is distributed uniformly over the outer surface of the filter medium 23 in an inner annular space which remains clear between the flow channelling structure 27 and the filter medium 23. If the phase adjuster 10 takes up lubricating oil, the lubricating oil which has been pre-cleaned by means of the centrifugal force separator 21 flows around the filter medium 23 in an axial and tangential direction, in order to ultimately flow through the filter medium 23 into the hollow interior space of the filter and from there to the filter outlet 25 and through the filter outlet 25 into and through the pressure port P of the phase adjuster 10.

The absorbing medium of the centrifugal force separator 21 can in particular contain or consist of fibrous material. Fleece materials are particularly suitable. The absorbing medium can instead also be a fabric material or a mesh or can contain a fabric material and/or mesh, for example in addition to fleece material. Open-pored foam material is likewise a suitable absorbing medium and can form the absorbing medium of the centrifugal force separator 21 instead of the other absorbing media mentioned or in combination with one or more of these other absorbing media. The absorbing medium can be single-ply or multi-ply and can for example comprise one or more layers of fleece and one or more layers of fabric in a radially layered arrangement. It can be formed as a graded medium, such that it exhibits a porosity which is comparatively high at its inner circumference pointing towards the filter structure 22 but decreases radially outwards. In other modifications, the centrifugal force separator 21 can comprise a sleeve-shaped perforated shutter. A perforated sleeve structure can exhibit a slightly smaller outer diameter than the hollow space 7, such that an absorbing space for the dirt particles separated in the centrifugal force separator 21 remains, radially behind such a perforated screen-like structure as viewed from the rotational axis R. Fleece material and/or fabric material and/or mesh material and/or an open-pored foam material can be arranged in the absorbing space in order to even more securely trap the separated dirt particles.

The absorbing medium can consist of or contain plastic, glass or paper, for example plastic fibres and/or glass fibres and/or a plastic fabric and/or open-pored sponge made of plastic. Alternatively or additionally, the absorbing medium can contain a metal material, for example metal fibres and/or metal particles and/or a metal fabric material and/or metal fleece and/or open-pored metal foam. Combinations of a plastic material and a metal material are also possible. If a magnetic metal material is used, the absorbing medium can also separate ferritic particles irrespective of their particle size.

The statements made with respect to the material of the absorbing medium also apply in the same way to the material of the filter medium 23.

Figure 9:
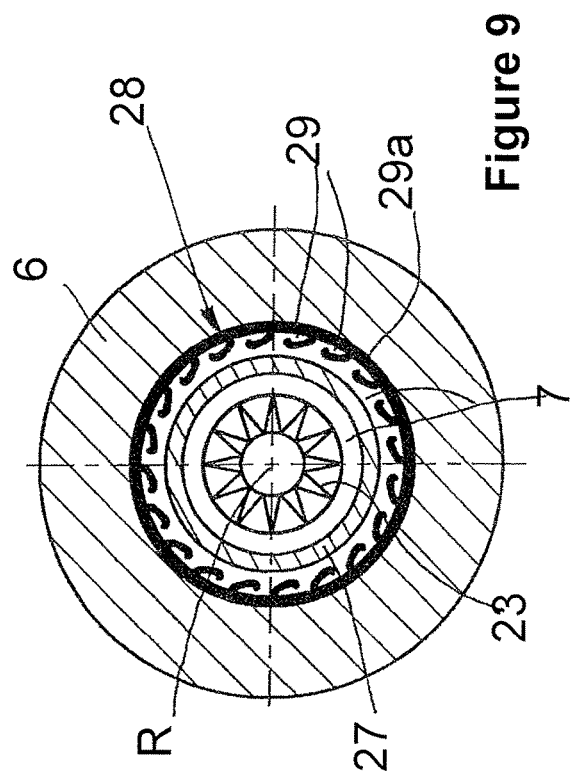
FIG. 9 an alternative centrifugal force separator.

FIG. 9 shows an alternative embodiment of the centrifugal force separator 21, in a cross-section through the cam shaft 6, wherein this can be the same cross-sectional plane as in FIG. 8. The centrifugal force separator 28 in FIG. 9 can substitute for the centrifugal force separator in FIG. 8. The centrifugal force separator 28 comprises a multitude of scoops in a distribution about the rotational axis R, wherein the scoops protrude from a circumferential wall of the hollow space 7 radially inwards and substantially in the tangential direction, such that pockets 29 are formed between the circumferential wall and the scoops for absorbing dirt particles forced outwards by the centrifugal force. The absorbing pockets 29 open in the rotational direction of the cam shaft 6. In addition to absorbing dirt particles, the scoops also perform a function of rotationally slaving the lubricating oil. Rotational slaving is however also improved relative to a smooth circumferential wall of the hollow space by the absorbing medium of the centrifugal force separator 21. The centrifugal force separator 28 in FIG. 9 also comprises a fitting ring 29a which is used for fitting and from which the scoops protrude radially inwards and in the tangential direction.

Figure 10:
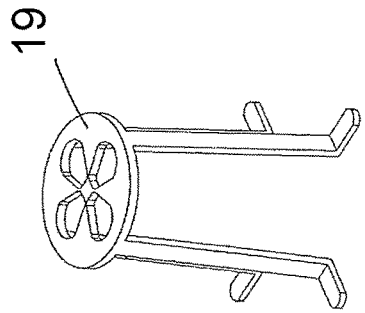
FIG. 10 a support structure of a reflux valve of the phase adjuster in FIG. 5.

FIG. 10 shows the support structure 19 of the reflux valve which is arranged in the control valve (FIG. 5). The support structure 19 comprises a support disc, which the lubricating oil can flow through, at one axial end and holding arms which project axially from support disc and radially outwards. The support structure 19 is formed such that it offers as little resistance as possible to the lubricating oil flowing through the pressure port P into the control valve. The ends of the holding arms which face axially away from the support disc comprises holding elements which project outwards and via which the support structure 19 grips behind a collar provided in the valve housing 13, in order to be able to absorb the force of the blocking member spring 18.

Figure 11:
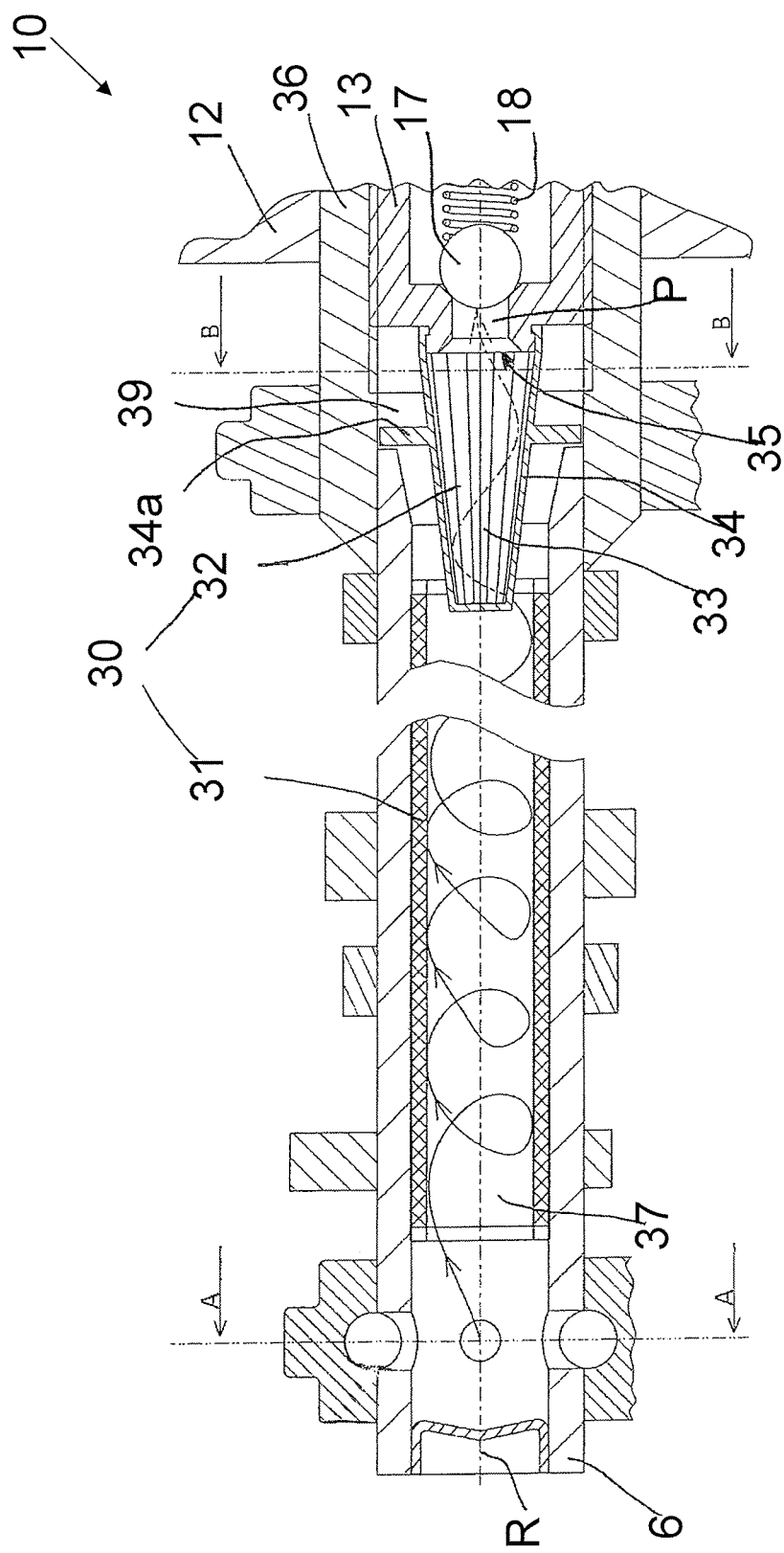
FIG. 11 a particle separator of a second example embodiment.

FIG. 11 shows a particle separator 30 in a second example embodiment. The particle separator 30 is likewise arranged immediately upstream of the phase adjuster 10. The phase adjuster 10 can correspond completely to the phase adjuster 10 of the first example embodiment or, as can be seen in FIG. 11 and described below, can deviate from it in some details. Wherever the phase adjuster 10 assigned to the particle separator 30 is not described in more detail, it corresponds in any event to the phase adjuster 10 of the first example embodiment.

The particle separator 30 likewise comprises a first separating stage 31 and a second separating stage 32 which the lubricating oil flows through one after the other, i.e. sequentially, on its way to the phase adjuster 10. The upstream first separating stage is formed as a centrifugal force separator 31, as in the first example embodiment. The downstream second separating stage is likewise formed as a filter structure 32 as in the first example embodiment. The separating stages 31 and 32 are however arranged successively or at least substantially successively not only in relation to the flow direction of the lubricating oil but also in the axial direction. The centrifugal force separator 31 is arranged entirely within the hollow space 37 of the cam shaft 6 and comprises an absorbing medium which is arranged on the inner circumference of the cam shaft 6. With regard to the absorbing medium of the centrifugal force separator 31, the statements made with respect to the first example embodiment apply in the same way. The absorbing medium can in particular be a fibrous material which lines an axial portion of the circumferential wall of the hollow space 37. The alternative absorbing media described can alternatively or additionally also be realised.

As likewise in the first example embodiment, the filter structure 32 comprises a filter medium 33, which the lubricating oil can flow through, and a support structure 34 which supports the filter medium 33 and is used for fitting the filter structure 32 directly on the pressure port P. As in the first example embodiment, the filter medium 33 is pleated by being placed in folds around the circumference of the rotational axis R. Once it has flowed through the centrifugal force separator 31, the lubricating oil reaches the filter structure 32, flows around its outer circumference axially but with a superimposed rotational movement, i.e. spirally, flows through the filter medium 33 and flows in the axial direction in the unimpeded central interior space of the filter to the pressure port P which is in axial alignment with the interior space of the filter, as in the first example embodiment.

As long as the phase adjuster 10 does not take up any lubricating oil, at least the centrifugal force separator 31 is effective, wherein as the dwelling time increases, a higher proportion of the dirt particles contained in the lubricating oil are centrifuged into the absorbing medium of the centrifugal force separator 31. Arranging the centrifugal force separator 31 in a tube portion of the cam shaft 6 enables the centrifugal force separator 31 to be realised with a large axial length of the absorbing medium which is advantageous for extracting dirt particles by centrifuging. The greater the axial length of the centrifugal force separator 31, the higher the capacity for absorbing dirt particles, all other installation conditions being equal, and the longer the dwelling time of the lubricating oil in the portion of the hollow space 37 which is surrounded by the centrifugal force separator 31. This applies equally to the centrifugal force separator 21 of the first example embodiment and in principle also to a centrifugal force separator arranged on a rotary body other than the cam shaft 6. Arranging it in the cam shaft 6 does however have the advantage that, like the centrifugal force separator 21 of the first example embodiment, the centrifugal force separator 31 can be realised on the flow path of the lubricating oil near to the phase adjuster 10, thus countering a subsequent introduction of dirt particles into the cleaned lubricating oil.

Unlike the first example embodiment, the filter structure 32 is not formed substantially within the centrifugal force separator 31. As can be seen in FIG. 11, there can be a minor axial overlap between the centrifugal force separator 31 and the filter structure 32, but a majority of the axial length of the filter structure 32 protrudes beyond the centrifugal force separator 31 in the direction of the phase adjuster 10. The disadvantage of an axial length which is greater than in the first example embodiment is matched by the advantage that design space is gained for the filter structure 32 and thus for the filter medium 33 in the radial direction and that the filter medium 33 can have a larger radial width than the filter medium 23 of the first example embodiment when the diameter of the hollow space 37 formed in the cam shaft 6 corresponds to the diameter of the hollow space 7 of the first example embodiment.

In the second example embodiment, design space is also gained in the radial direction by a part of the filter structure 32 protruding axially out of the cam shaft 6 and into a radially broadened hollow space of a hollow body 36. The hollow body 36 is used for fitting the phase adjuster 10 on the end portion of the cam shaft 6. It is pressed or screwed onto the outer circumference of the cam shaft 6 or otherwise non-rotationally connected to the cam shaft 6 in order to obtain a radially widened end portion 39 of the hollow space 37. The hollow body 36 extends the hollow end portion of the cam shaft 6 and widens its hollow space 37 into the radially wider hollow space 39, such that design space for the control valve—the valve housing 13, blocking member 17 and blocking member spring 18 of which can be seen—and the filter structure 32 is created in accordance with the larger diameter of the hollow space 39. The rotor 12 of the phase adjuster 10 is non-rotationally connected to the hollow body 36 by means of the valve housing 13 and is non-rotationally connected via the hollow body 36 to the cam shaft 6.

In order to make the best possible use of the design space, the filter structure 32 and in particular its filter medium 33 exhibits the shape of a truncated cone, wherein the tapered end protrudes into the hollow space 37 of the cam shaft 6 and the radially wider end protrudes into the hollow space 39 of the hollow body 36. To assist this, the cam shaft 6 can be widened at its axially outer end, as can be seen in FIG. 11, in order to widen the hollow space 37 even there. The filter structure 32 is held on the valve housing 13 by means of a locking connection, wherein the locking connection is between the support structure 34 and a radial appendage of the valve housing 13 which is formed on the pressure port P. The filter outlet 35 and the pressure port P are in axial alignment with each other, as in the first example embodiment. The support structure 34 comprises thin, radially projecting arms 34a for centring it in the hollow space 37, 39. The arms 34a can also serve to axially support the filter structure 32 in order to keep the filter structure 32 axially in position even if the locking connection to the valve housing 13 is released.

Figure 12:
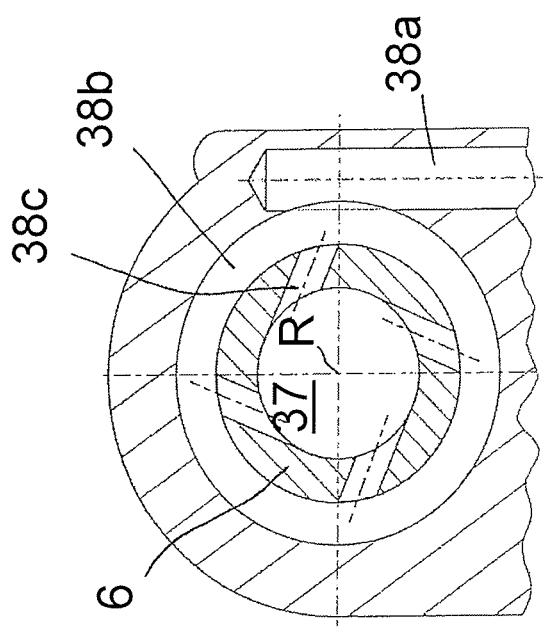
FIG. 12 the cross-section A-A from FIG. 11.

FIG. 12 shows the inlet into the hollow space 37 of the cam shaft 6, in the cross-section A-A from FIG. 11. The tangential feed 38a can be seen which has already been described on the basis of the first example embodiment and which is formed in a body which is stationary when the engine is in operation, for example a bearing body for the cam shaft 6. The feed 38a feeds into an annular gap 38b, formed between the cam shaft 6 and said body, and flows from the annular gap 38b into the hollow space 37 via inlet channels 38c which lead through the cam shaft 6. The inlet channels 38c likewise point with a tangential directional component with respect to the rotational axis R. Thus, in the second example embodiment, the rotational impulse of the lubricating oil flow again increases not only because of the rotational movement of the cam shaft 6 but also because of the doubly tangential feed. The feed 38a and the inlet channels 38c expediently point in the rotational direction of the cam shaft 6.

Figure 13:
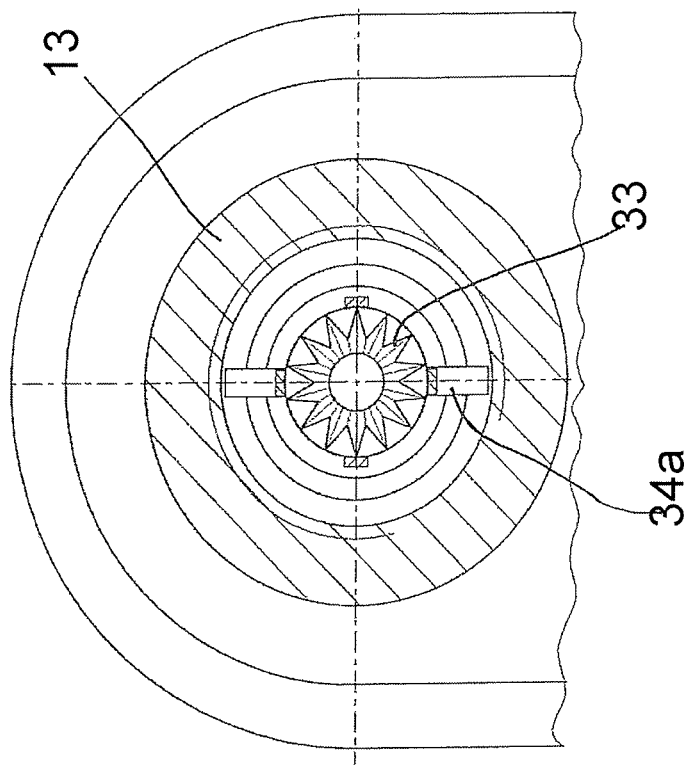
FIG. 13 the cross-section B-B from FIG. 11.

FIG. 13 shows the cross-section B-B from FIG. 11. The pleated filter medium 33 and the central interior space of the filter, and also the arms 34a of the support structure 34, can in particular be seen.

Figures 14, 15:
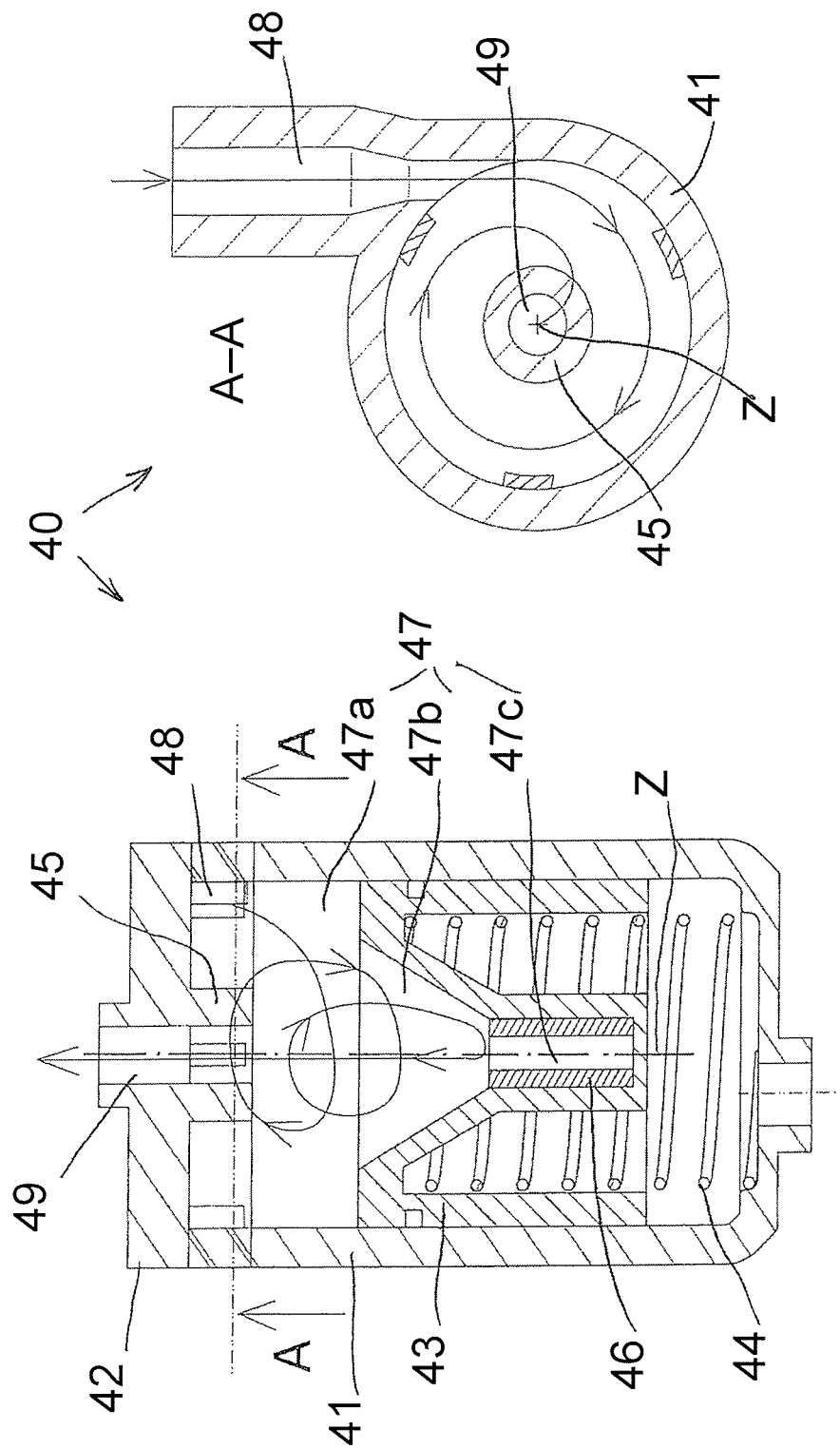
FIG. 14 a particle separator of a third example embodiment.
FIG. 15 the cross-section A-A from FIG. 14.

FIGS. 14 and 15 show a particle separator 40 of a third example embodiment: in FIG. 14, in a central longitudinal section; and in FIG. 15, in the cross-section A-A from FIG. 14. The particle separator 40 is a cyclone separator. It is formed in a pressure storage via which the phase adjuster 10 is supplied with the lubricating oil as a pressure medium. Cam shaft phase adjusters comprising a pressure storage are described in U.S. Pat. No. 8,061,317 B2, and U.S. Pat. No. 9,200,546 B2, which are each incorporated by reference, to name but two examples.

The pressure storage and/or cyclone separator 40 comprises a housing featuring a housing part 41 and a cover 42 which closes off the housing part 41 axially opposite a base of the housing part 41. A piston 43 is accommodated in the housing 41, 42, such that it can be moved axially back and forth. A spring force is applied to the piston 43 in the direction of the cover 42 by a spring 44. The cyclone separator 40 is arranged upstream of the phase adjuster 10 in the lubricating oil feed to the phase adjuster 10, such that lubricating oil can only reach the phase adjuster 10 through the cyclone separator 40.

The lubricating oil flows through the inlet 48 into a cyclone space 47 which is delineated in the cyclone separator 40 by the housing part 41, the cover 42 and the piston 43. The inlet 48 is embodied such that the lubricating oil in the cyclone space 47 performs a rotational movement about a central cyclone axis. As the pressure at the inlet 48 increases, the rotational movement is amplified. As can be seen in FIG. 15, the inlet 48 comprises a feed channel which points tangentially to the central longitudinal axis of the cyclone separator 40—the central cyclone axis Z—and which also feeds tangentially into the cyclone space 47, such that the said vortex flow is created in the cyclone space 47. The lubricating oil in the cyclone space 47 acts on the piston 43 and moves it, counter to the spring force of the spring 44, in the direction of enlarging the cyclone space 47.

The cyclone space 47 comprises an axial cylindrical vortex portion 47a which is axially delineated by the cover 42 and by the front side of the piston 43 which faces the cover 42. The vortex portion 47a is adjoined by an axially orientated funnel portion 47b in which the cyclone space 47 is gradually constricted. The constricted end of the funnel portion 47b feeds into a separating portion 47c. An absorbing medium 46 for dirt particles to be separated is arranged in the separating portion 47c. The separating portion 47c can in particular be axially cylindrical, as can be seen in FIG. 14. The absorbing medium 46 lines the circumferential wall of the separating portion 47c, such that dirt particles are pressed into and trapped in the absorbing medium 46 due to the centrifugal force. The lubricating oil into and trapped in the absorbing medium 46 due to the centrifugal force. The lubricating oil from which the separated dirt particles have been removed flows off towards the pressure port P of the phase adjuster 10 via an outlet 49.

The absorbing medium 46 can in particular be formed so as to correspond to the absorbing medium of the first example embodiment, i.e. it can for example comprise one or more layers of a fibrous material and/or one or more layers of fabric and/or can be a graded medium.

The outlet 49 extends through the cover 42. The outlet 49, which leads out of the cover 42 in parallel with the cyclone axis Z, is extended into the cyclone space 47 so that the lubricating oil flowing in laterally cannot immediately flow off via the outlet 49. The extension is formed by an immersion support 45 in the manner of immersion tubes such as are known in cyclone separators. The immersion support 45, however, protrudes by only a short axial distance into the cyclone space 47. The length by which the immersion support 45 can protrude into the cyclone space 47 is limited by the piston 43.

The inlet 48 is formed on a circumferential wall of the cyclone space 47—in the example embodiment, on a circumferential wall of the housing part 41. The outlet 49, by contrast, axially extends centrally along the cyclone axis Z through the cover 42. The immersion support 45 extends axially into the cyclone space 47 and expediently overlaps the inlet 48 over all of its height as measured in parallel with the cyclone axis Z, in order to screen the outlet 49 against the inlet 48.

The piston 43 forms the funnel portion 47b and also the separating portion 47c so that the pressure storage and/or cyclone separator 40 can be designed to be axially short. If the delivery pressure of the lubricating oil falls below a value which is determined by the spring 44, the spring 44 pushes the piston 43 axially towards the cover 42 until it abuts against it. In the abutting position, the axial length of the vortex portion 47a is at a minimum. The immersion support 45 can protrude into the funnel portion 47b when the piston 43 assumes its abutting position. The piston 43 should not however seal the inlet 48 in its abutting position.

The cyclone separator 40 can substitute for the particle separator 20 or more preferably for the centrifugal force separator 21 of the first example embodiment only. In other embodiments, the cyclone separator 40 can however also be provided in addition to the particle separator 20 of the first example embodiment and can be arranged upstream of the particle separator 20 in such embodiments. If the cyclone separator 40 substitutes for the centrifugal force separator 21 only, a filter structure comprising a filter medium, preferably a pleated filter medium, is again arranged downstream of the cyclone separator 40, as for example in the first example embodiment or in the second example embodiment. The cyclone separator 40 can also be arranged upstream of the particle separator 30 of the second example embodiment, in order to feed lubricating oil which has already been pre-cleaned to the centrifugal force separator 31. In another modification, it can substitute for the centrifugal force separator 31.

Figure 16:
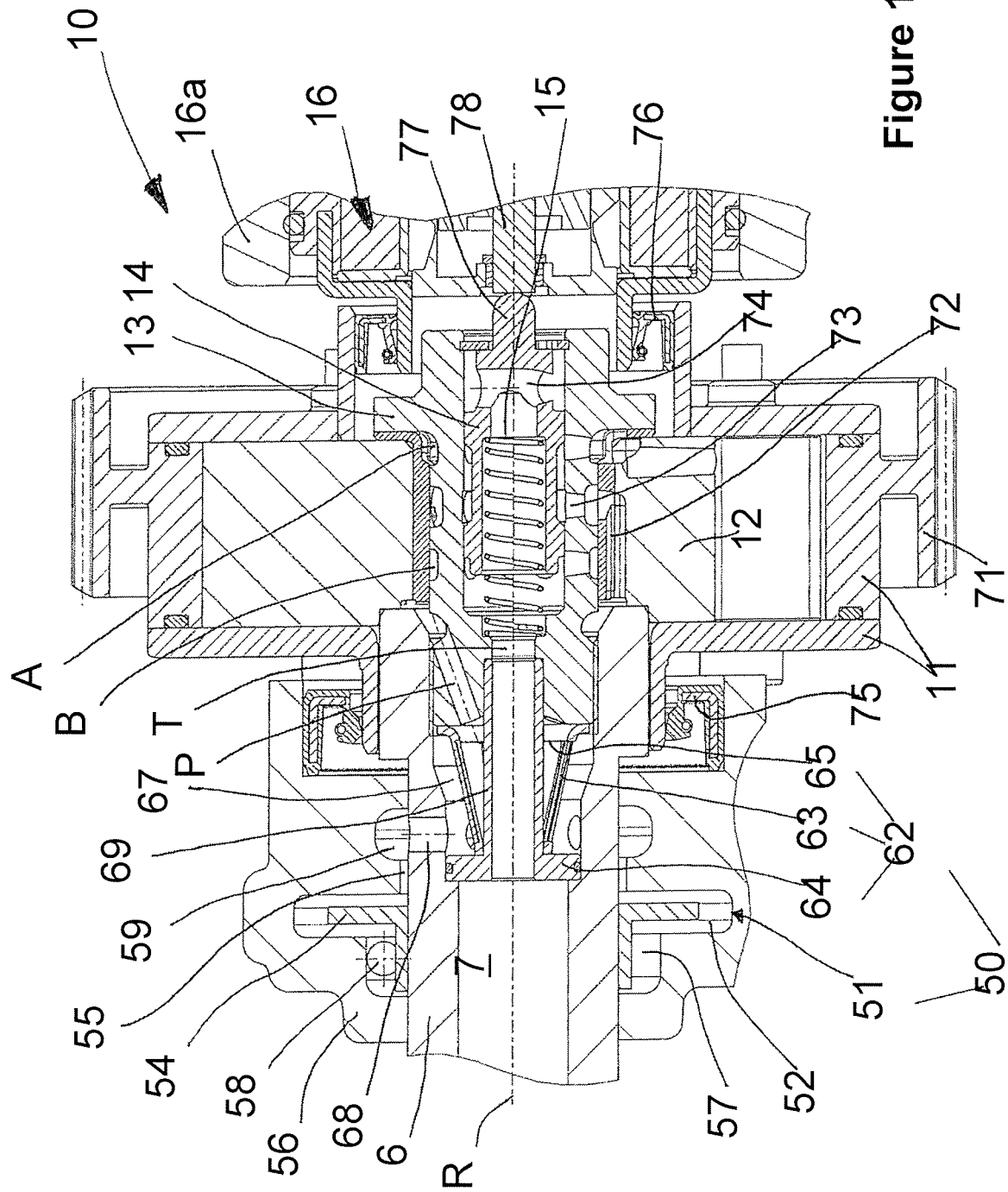
FIG. 16 a particle separator of a fourth example embodiment.

FIG. 16 shows a particle separator 50 of a fourth example embodiment. The particle separator 50 is formed in a co-operation between the cam shaft 6 and a non-rotatable body 56. The cam shaft 6 extends axially through the body 56. The body 56 can in particular be a bearing body for the cam shaft 6.

The cam shaft 6 and the body 56 together form a hollow space 57 which is delineated on the radially inner side by the cam shaft 6 and on the radially outer side by the body 56. An inlet 58 feeds into the hollow space 57, wherein lubricating oil flows into the hollow space 57 through the inlet 58. The inlet 58 can be embodied as described with respect to the first example embodiment or can be embodied like the feed 38a of the second example embodiment (FIG. 12), in order to immediately imbue the lubricating oil with a rotational impulse in the rotational direction of the cam shaft 6 even as it flows in. In the hollow space 57, the rotating cam shaft 6 imbues the lubricating oil with an additional rotational impulse. The rotational impulse can be amplified even more by non-rotationally connecting a slaving structure 54 to the cam shaft 6. The slaving structure 54 can comprise projections and for example form a vane wheel in order to impose a tangential acceleration and/or radial acceleration on the lubricating oil as it flows around or through it. The slaving structure 54 is arranged in an axial portion of the hollow space 57 in which the hollow space 57 is radially widened, in order to form a centrifugal force separator 51. The widening is denoted by 52. Downstream of the slaving structure 54 and the widening 52, the hollow space 57 is constricted to form an annular gap 55 through which the lubricating oil flows in the axial direction. The annular gap 55 connects the hollow space 57 to an outlet 59 of the particle separator 50. Once it has flowed through the particle separator 50, the lubricating oil flows through the outlet 59 of the particle separator 50 into a hollow space 7 which, as in the first and second example embodiments, is formed in an end portion of the cam shaft 6 on which the phase adjuster 10 is fitted. The lubricating oil thus reaches the pressure port P of the phase adjuster 10 through the outlet 59 and the hollow space 7.

The particle separator 50 is formed in the manner of a dosing bearing. The annular gap 55 downstream of the centrifugal force separator 51 prevents lubricating oil laden with dirt particles from simply flowing through the hollow space 57. The slaving structure 54 likewise acts in this sense. The trapped dirt particles are above all centrifuged by the centrifugal force into the radial widening 52, where they are trapped. The rotational movement of the cam shaft 6 relative to the body 56 prevents the annular gap 55 from becoming blocked.

An absorbing medium for absorbing and trapping dirt particles can be arranged in the widening 52. With regard to the optional absorbing medium, the statements which have already been made with respect to the centrifugal force separator 21 of the first example embodiment apply. The absorbing medium can in particular contain or consist of fibrous material or a fabric material, to name but two examples. Alternatively, however, absorbing pockets can also be formed in the widening 52 which for example correspond to the absorbing pockets 29 from FIG. 9.

In the example embodiment, the slaving structure 54 is non-rotationally connected to the cam shaft 6. In one modification, a deflecting structure which is fixedly connected to the body 56 can be provided instead of the slaving structure 54 and can comprise deflecting elements in a distribution about the rotational axis R which correspond to the deflecting structure 26 of the first example embodiment (FIGS. 6 and 7), in order to deflect the lubricating oil with a tangential directional component with respect to the rotational axis R and so amplify the rotational movement and the effect of the centrifugal force.

As in the other example embodiments, the particle separator 50 performs its separating function in multiple separating stages. The centrifugal force separator 51 forms the first separating stage. Downstream of the centrifugal force separator 51, the particle separator 50 comprises a second separating stage 62 which, as in the first and second example embodiments, is a filter structure 62 comprising a filter medium 63 and a support structure 64 for the filter medium 63. The lubricating oil which is pre-cleaned in the centrifugal force separator 51 has to flow through the filter medium 63 in order to reach the pressure port P of the phase adjuster 10.

In relation to its filter properties, the filter structure 62 corresponds to the filter structures 22 and 32 of the previous example embodiments. As in the first and second example embodiments, the filter medium 63 is pleated, i.e. it is placed in folds around the filter axis which coincides with the rotational axis R. The filter medium 63 can as such correspond to the filter media 23 and 33 of the first and second example embodiments.

The end portion of the hollow space 7 which faces the phase adjuster 10 widens radially, thus producing a widened hollow space 67 and therefore design space for the valve housing 13 of the control valve and also for the filter structure 62. The filter structure 62 is accommodated in the radially widened end portion of the hollow space 7. It is axially supported in one direction on a facing end face of the valve housing 13 and in the opposite direction on a collar of the cam shaft 6.

The hollow space 67 in which the filter structure 62 is arranged comprises an inlet 68 which exhibits a tangential directional component in relation to the rotational axis R which also forms the central longitudinal axis of the hollow space 67 and a central filter axis. The lubricating oil which flows from the outlet 59 of the hollow space 57 into the inlet 68 thus obtains a tangential directional component with respect to the rotational axis R as it flows through the inlet 68. The lubricating oil therefore flows through the hollow space 67 with a tangential directional component when the phase adjuster 10 takes up lubricating oil. The lubricating oil also correspondingly flows around the filter structure 62. The lubricating oil therefore not only flows through the filter medium 63 in the radial direction but also flows around the filter medium 63 in the circumferential direction and in the axial direction. This generates transverse flow filtration.

One particularity of the phase adjuster 10 is that if the rotor 12 is adjusted relative to the stator 11, the one or more pressure chambers which are relieved of pressure when adjusting is performed are not relieved through the control valve into the outer environment of the phase adjuster 10. The lubricating oil of the pressure-relieved pressure chamber(s) is drained from the respective working port A or B into the hollow space of the valve housing 13 or into a hollow space formed in the valve piston 14 and from the relevant hollow space through the tank port T of the valve housing 13. In the example embodiment, the lubricating oil flows through the tank port T into the hollow cam shaft 6, specifically into its hollow space 7, whence it flows off towards the lubricating oil sump S (FIG. 1).

The pressure port P and the tank port T are provided at the same axial end of the valve housing 13 and each extend up to an axial end face of the valve housing 13. The tank port T extends up to and into the hollow space of the valve housing 13. The hollow space of the valve piston 14 axially faces the tank port T. Thus, depending on the position which the valve piston 14 assumes in the valve housing 13, either the working port B is connected to the tank port T through the hollow space of the valve housing 13 by bypassing the valve piston 14, or the working port A is instead connected to the tank port T by the central hollow space of the valve piston 14. The hollow space of the valve piston 14 opens into the hollow space of the valve housing 13, axially facing the tank port T.

When the pressure is relieved, the lubricating oil is drained from both the working port A and the working port B through the tank port T.

The tank port T is formed as an axial passage in the valve housing 13. The tank port T connects the hollow space of the valve housing 13, in which the valve piston 14 is arranged such that it can be moved back and forth, and also the hollow space of the valve piston 14 to the hollow space 7 of the cam shaft 6.

Unlike the first and second example embodiments, the filter structure 62 comprises a central tubular outflow portion 69 through which the lubricating oil flows off from the phase adjuster 10. The outflow portion 69 is arranged on the tank port T of the control valve, in axial alignment with it. The lubricating oil can thus flow off with little resistance through the tank port T, which extends axially in the valve housing 13, and through the outflow portion 69 which adjoins it in axial alignment. From the outflow portion 69, the lubricating oil which is flowing off enters the hollow space 7 of the cam shaft 6 and flows off through the hollow space 7 towards the lubricating oil sump S (FIG. 1).

The phase adjuster 10 of the fifth example embodiment is driven via a belt drive in a fixed rotational speed relationship to the crankshaft. The stator 11 is non-rotationally connected to a belt output wheel 71 of the belt drive. In the example embodiment, the belt output wheel 71 is moulded in an original-moulding process in one piece with a middle part of the stator 11 which is joined together from multiple parts. The belt output wheel 71 surrounds the actual stator 11 over its outer circumference.

The belt drive is realised as a dry-running belt drive. The lubricating oil flowing off from the phase adjuster 10 is therefore not drained via a tank port T (FIG. 5) connected to the outer environment of the phase adjuster 10, as in the first and second example embodiments, but rather through the hollow valve housing 13 within the phase adjuster 10 via the axial tank port T already mentioned and, in an axial extension of the tank port T, through the outflow portion 69. The phase adjuster 10, i.e. the components of the phase adjuster 10 which come into contact with the lubricating oil, is therefore sealed off from the environment and thus from the belt drive. It is sealed off axially on both sides of the array consisting of the stator 11 and the rotor 12, by means of a shaft sealing ring 75 on the side facing the cam shaft 6 and a shaft sealing ring 76 on the side facing the electromagnetic device 16. A radial shaft sealing ring serves as each of the sealing ring 75 and 76.

The hydraulic region of the phase adjuster 10 is sealed off from the body 56 by means of the shaft sealing ring 75. The hydraulic part of the phase adjuster 10 is sealed off from a housing 16a of the electromagnetic device 16 by means of the shaft sealing ring 76. The housing 16a and the body 56 cannot be moved relative to each other. They are fixedly connected to an engine housing of the internal combustion engine in a way which is not shown. The body 56 can in particular be a cast region of the engine housing. The housing 16a can be fitted, stationary relative to the engine housing, on the engine housing or a different structure which is connected to it. The belt can thus revolve dry, i.e. with no lubricating oil which flows off from the phase adjuster 10, in a hollow space of the engine housing.

The filter structure 62 comprises a filter outlet 65, axially facing the valve housing 13, which extends around the outflow portion 69. The phase adjuster 10 comprises a pressure port P featuring multiple pressure port channels which are arranged in a distribution about the rotational axis R and feed to the end face of the valve housing 13, axially opposite the filter outlet 65, and which each extend through the valve housing 13 from where they feed to the end face, pointing obliquely outwards, to the rotational axis R. Lubricating oil which flows obliquely outwards through the filter outlet 65 to the pressure port P and through the pressure port channels is channeled in one or more connecting channels 72 on the outer circumference of the valve housing 13 into one or more pressure channels 73 which extends or which each extend radially through the valve housing 13 towards the valve piston 14. Depending on the control position which the valve piston 14 assumes, the pressure port P is connected to either the working port A or the working port B via 72 and 73.

In FIG. 16, the valve piston 14 has assumed a control position in which the pressure port P is connected to the working port A. In this control position, the working port B is connected to the hollow space formed in the valve housing 13 and, via said hollow space, to the tank port T and the outflow portion 69 of the filter structure 62. The lubricating oil which is cleaned by means of the particle separator 50 thus flows through the pressure port P and the working port A into the pressure chamber(s) assigned to the working port A, while the lubricating oil from the pressure chamber(s) assigned to the working port B flows off via the tank port T and the outflow portion 69. If the valve piston 14 is switched by means of the electromagnetic device 16, i.e. moved into the other control position against the force of the valve spring 15, the connection between the pressure channel(s) 73 and the working port A is interrupted, and the pressure channel(s) 73 is/are instead connected to the working port B. The working port A is simultaneously connected to the hollow space of the valve housing 13 via one or more passages 74 formed in the valve piston 14, such that the lubricating oil can flow off from the working port A through the tank port T and the outflow portion 69.

The filter structure 62 therefore performs a dual function. In its primary function, it serves to clean the lubricating oil to be fed to the phase adjuster 10. In its secondary function, it serves to drain the lubricating oil which the phase adjuster 10 consumes in the performance of its setting function.

It may also be stated with respect to the geometry of the filter structure 62 that the filter medium 63 extends around the tubular outflow portion 69. An annular interior space of the filter which remains between the filter medium 63 and the outflow portion 69 comprises the filter outlet 65 at an end axially facing the control valve, in particular the pressure port P. The filter medium 63 widens towards the pressure port P.

The electromagnetic device 16 is connected to an engine controller for the internal combustion engine and receives control signals from the engine controller, on the basis of which it determines the control position of the valve piston 14 in co-operation with the valve spring 15. The electromagnetic device 16 comprises an electromagnetically operable actuator 78 which is in an axial pressing contact with the valve piston 14 and which, when current is passed through a coil of the electromagnetic device 16, moves the valve piston 14 into the other control position against the force of the valve spring 15. The abutting and/or pressing contact between the valve piston 14 and the actuator 78 is punctiform. For this purpose, the end of the actuator 78 facing the valve piston 14 can be curved spherically or otherwise bulbously towards the valve piston 14, as shown in FIG. 5 for the first example embodiment. In the fifth example embodiment, the valve piston 14 comprises an end 77 which is spherical or otherwise bulbous towards the actuator 78, axially facing the actuator 78, while the end of the actuator 78 which faces the valve piston 14 is substantially planar. The bulge on the valve piston side has the advantage that the point of contact between the valve piston 14 and the actuator 78 does not drift if the valve piston 14 and the actuator 78 are not exactly in axial alignment with each other when installed.

The filter media 23, 33 and 63 of the example embodiments and the filter medium of a filter structure of the particle separator in accordance with the invention in general can be single-ply or multi-ply. They can in particular comprise one or more layers of a fibrous material and/or one or more layers of a fabric material and/or one or more layers of a mesh. They can be formed as graded media. When formed as graded media, they are coarser on the respective inflow side than on the outflow side. The inflow side can in particular be formed by the outer circumference of the respective filter medium, as in the example embodiments.

The absorbing media of the centrifugal force separators and/or the filter media of the filter structures of the particle separator in accordance with the invention can contain or consist of magnetised metal material, in order to trap ferritic particles irrespective of their particle size. Ferritic particles are damaging in particular to electromagnetic actuators of phase adjusters. Magnetised metal material can for example also be arranged in the widening 52 of the centrifugal force separator 51 of the fourth example embodiment. The particle separator can comprise a ferrite separator featuring magnetised metal material, i.e. a separating stage for ferritic particles, in addition to the separating stages described and in particular upstream of the first separating stage. Additionally or alternatively, a separating stage for ferritic particles can be provided between the first separating stage and the second separating stage in the flow direction of the lubricating oil.

Figure 17:
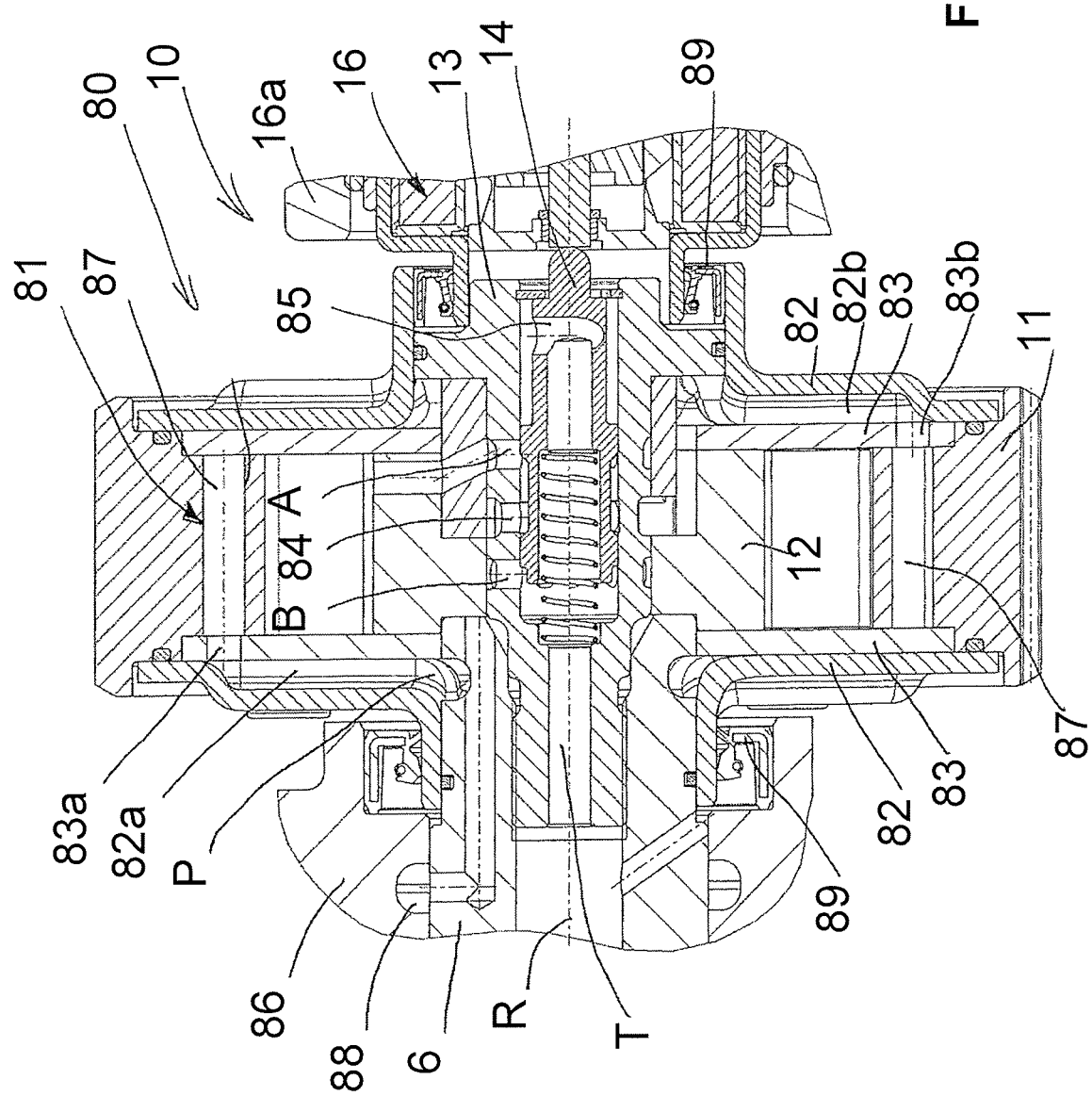
FIG. 17 a particle separator of a fifth example embodiment.

FIG. 17 shows a phase adjuster 10 comprising a particle separator 80 of a fifth example embodiment. The particle separator 80 consists of a centrifugal force separator 81 which is formed in hollow spaces 87 of the stator 11. In further developments, the particle separator 80 can comprise one or more additional separating stages, for example a separating stage arranged upstream of the centrifugal force separator 81 and/or a separating stage arranged downstream of the centrifugal force separator 81. The centrifugal force separator 51 comprising the annular gap 55 of the fourth example embodiment can then for example be connected upstream of the centrifugal force separator 81 and/or a filter structure comprising a filter medium which fluid can flow through can then for example be connected downstream of the centrifugal force separator 81.

The lubricating oil is fed to the phase adjuster 10 through one or more feed channels 88 and one or more inlet channels 8 connected to them, at a pressure port P of the phase adjuster 10. The feed channel(s) 88 is/are formed in a bearing body 86 which mounts the cam shaft 6. The feed channel(s) 88 is/are adjoined by the one or more inlet channels 8 which extend/s in the end portion of the cam shaft 6 and feed/s into the pressure port P. Multiple feed channels 82a in a distribution around the rotational axis R extend radial outwards from the pressure port P. The feed channels 82a are each connected to the particle separator 80 via an inlet 83a.

Figure 18:
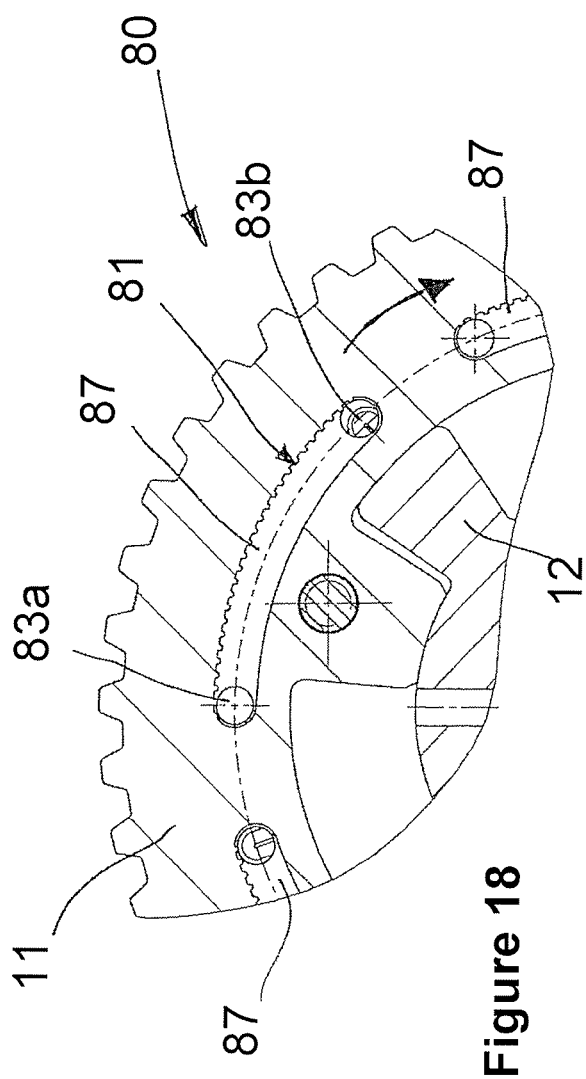
FIG. 18 the particle separator of the fifth example embodiment, in a cross-section.

FIG. 18 shows the phase adjuster 10 of the fifth example embodiment in a cross-section. Only an outer circumferential region of the phase adjuster 10, in which the particle separator 80 is situated, is shown. It can also be seen in the cross-section that the phase adjuster 10 is embodied as a vane motor.

The particle separator 80 comprises multiple hollow spaces 87 which extend around the rotational axis R near the outer circumference of the stator 11. The hollow spaces 87 each extend over an angular segment only, i.e. they are hollow space angular segments. The hollow spaces 87 sub-divide the stator 11 into an outer stator ring and an inner region of the stator comprising vanes which protrude radially inwards. The stator ring and the inner region of the stator are connected via support structures which extend in the radial direction between adjacent hollow spaces 87.

In the example embodiment, the hollow spaces 87 are separated from each other. They are next to each other and level in the circumferential direction, wherein one of the support structures extends between each two adjacent hollow spaces 87. The outer stator ring, the inner region of the stator and the connecting support structures can be moulded in one piece in an original-moulding method, in particular by die-casting or pressing and sintering. In modifications, however, the hollow spaces 87 can also be connected to each other in the circumferential direction and form a contiguous hollow space 87 which encircles the rotational axis R through 360°. In such embodiments, support structures would no longer extend over the whole of the axial length of the hollow spaces 87 which are separated from each other in the example embodiment, but rather only then over some of the axial length. In another modification, support structures in the middle can be omitted if the outer stator ring and the inner region of the stator are fixedly connected to each other, forming a seal, on each of the end faces. In such modifications, the outer stator ring, the inner region of the stator and the connecting structures on the end face would be produced separately from each other and joined together to form the stator.

The lubricating oil flows through the hollow spaces 87 in the axial direction. It is fed to the respective hollow space 87 through a respectively assigned inlet 83a on one end face and flows off through an assigned outlet 83b on the other, axially opposite end face and a continuative drainage channel 82b adjoining the outlet 83b. In the drainage channels 82b, the lubricating oil flows back towards the rotational axis R and enters the hollow space of the valve housing 13 via one or more pressure channels 84. The pressure channel(s) 84 form/s the pressure port of the control valve.

In FIG. 17, the valve piston 14 has assumed a control position in which the pressure port P is connected to the control port A via the centrifugal force separator 81 and the pressure channel(s) 84. The control port B is connected to the tank port T of the control valve through the hollow space of the valve housing 13 and is relieved of pressure via the tank port T and continuative channels. If the valve piston 14 is switched to the other control position by means of the electromagnetic device 16, the working port B is connected to the pressure channel(s) 84, while the working port A is connected to the tank port T via one or more passages 85 formed in the valve piston 14, such that the pressure chambers assigned to the working port A are relieved of pressure.

An inlet 83a and an outlet 83b feed into each of the hollow spaces 87, such that the lubricating oil flows in the rotational direction of the stator 11 from the respective inlet 83a to the respective outlet 83b. If the phase adjuster 10 takes up lubricating oil, the lubricating oil in the hollow spaces 87 is therefore not only rotated at the rotational velocity of the stator 11 but rather also exhibits an additional velocity which points in the rotational direction.

The surface of the outer circumferential wall in the hollow spaces 87 can be structured, as can be seen by way of example in FIG. 18, in order to trap particles centrifuged outwards by the centrifugal force more securely than with a smooth circumferential wall in the respective hollow space 87. In principle, however, the outer circumferential walls of the hollow spaces 87 can also be smooth, since the dirt particles adhere to each other when extracted by centrifuging, and a sort of slurry or cake of dirt particles is gradually formed even on a comparatively smooth circumferential wall. The stator 11 can for example be provided with a structured surface in the hollow space(s) 87 directly as it is original-moulded.

In an advantageous development, an absorbing medium of the type described, for example fibrous material, can be arranged on the outer circumferential wall of the respective hollow space 87, in order to improve the trapping properties of the centrifugal force separator 81.

Figure 19:
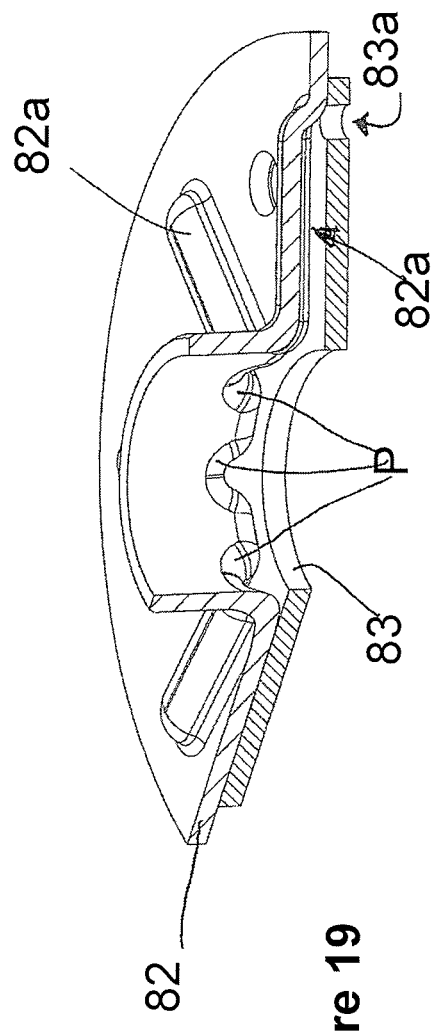
FIG. 19 an arrangement of structures for feeding lubricating oil to the particle separator of the fifth example embodiment.

FIG. 19 shows an outer structure 82 and an inner structure 83 which jointly form the pressure port P, the feed channels 82a which lead radially outwards from the pressure port P to the centrifugal force separator 81, and the inlets 83a. The structures 82 and 83 are planar structures which, when the phase adjuster 10 is assembled, are joined to a middle part of the stator 11 and axially abut each other such that they cannot be rotated and close off, on the end face, the pressure chambers formed between the stator 11 and the rotor 12. Another such array consisting of an outer structure 82 and an inner structure 83 is provided on the other end face of the stator 11 and non-rotationally connected to the middle part in the same way, in order to close off the pressure chambers on the other end face and to form the outlets 83b and the continuative drainage channels 82b (FIG. 17). The feed channels 82a are formed by fillet indentations in the outer structure 82. The inner structure 83 can simply be formed as a planar disc, as in the example embodiment, in order to seal the drainage channels 82b inwards, towards the pressure chambers, in a simple design. The continuative drainage channels 82b and outlets 83b out of the hollow space annular segments 87 are formed in the same way on the other end face by the structures 82 and 83 on that end face.

The phase adjuster 10 is driven by means of a belt drive, as in the fourth example embodiment. The outer circumference of the stator 11 is provided with a toothed gearing for a toothed engagement with the drive belt. The belt is a dry-running belt, as in the fourth example embodiment. The phase adjuster 10 is correspondingly sealed off on both its end face facing the cam shaft 6 and its opposite end face, on which the electromagnetic device 16 is arranged, by means of a radial shaft sealing ring 89 in each case.

REFERENCE SIGNS 1 lubricating oil pump
2 cooler
3 main oil separator
3a bypass valve
4 secondary flow oil separator
5 lubricating oil gallery
5$_i$ lubricating oil consumption points
6 cam shaft
7 hollow space
8 inlet, inlet channel
9 hollow space volume
10 cam shaft phase adjuster
11 stator
12 rotor
13 valve housing
14 valve piston
15 valve spring
16 electromagnetic device
16a housing
17 blocking member
18 blocking member spring
19 support structure
20 particle separator
21 centrifugal force separator, absorbing medium
22 filter structure
23 filter medium
24 support structure
25 filter outlet
26 deflecting structure
26a fitting ring
27 flow channelling structure
28 centrifugal force separator
29 absorbing pockets
29a fitting ring
30 particle separator
31 centrifugal force separator, absorbing medium
32 filter structure
33 filter medium
34 support structure
34a arm
35 filter outlet
36 hollow body
37 hollow space
38 inlet
38a feed
38b annular channel
38c inlet channel
39 hollow space
40 particle separator, cyclone separator
41 housing part
42 cover
43 piston
44 spring
45 immersion support
46 absorbing medium
47 cyclone space
47a vortex portion
47b funnel portion
47c separating portion
48 inlet
49 outlet
50 particle separator
51 centrifugal force separator
52 widening
53 —
54 deflecting or slaving structure
55 annular gap
56 body
57 hollow space
58 inlet
59 outlet
60 —
61 —
62 filter structure
63 filter medium
64 support structure
65 filter outlet
66 —
67 hollow space
68 inlet
69 outflow portion
70 —
71 belt output wheel 72 connecting channel
73 pressure channel
74 passage
75 shaft sealing ring
76 shaft sealing ring
77 valve piston end
78 actuator
79 —
80 particle separator
81 centrifugal force separator
82 outer structure
82a feed channel
82b drainage channel
83 inner structure
83a inlet
83b outlet
84 pressure channel, pressure port
85 passage
86 body
87 hollow space
88 feed channel
89 shaft sealing ring
A working port
B working port
P pressure port
R rotational axis, longitudinal axis
S lubricating oil reservoir
T tank port
Z cyclone axis

The invention claimed is:

1. A particle separating system for supplying a hydraulic cam shaft phase adjuster with cleaned engine lubricating oil as a pressure medium, wherein the cam shaft phase adjuster comprises a stator which can be rotary-driven, a rotor which is or can be connected to a cam shaft, and a control valve for hydraulically adjusting the rotational angular position of the rotor relative to the stator, the particle separating system comprising:
   a main oil separator which is arranged in the flow of the engine lubricating oil, upstream of a lubricating oil gallery of an internal combustion engine which is to be supplied with the engine lubricating oil, and which exhibits a separation efficiency of at least 50% for particles having a particle size P1 and a separation efficiency of at least 90% at a particle size P2>P1; and
   a particle separator which is arranged downstream of the main oil separator and upstream of the cam shaft phase adjuster or control valve, in order to clean the engine lubricating oil for the cam shaft phase adjuster,
   wherein the particle separator exhibits a separation efficiency of 50% at a particle size P3, where P1<P3<100 μm, and
   wherein the separation efficiency of the particle separator is at most 30% at the particle size P2.

2. The particle separating system according to claim 1, wherein the particle separator exhibits a separation efficiency of at least 90% at a particle size P4, where P2<P4<100 μm.

3. The particle separating system according to claim 1, wherein the separation efficiencies apply at least to particles made of a material from the group of materials consisting of sand, corundum, metal and metal alloys, wherein the metal and the metal alloys can in particular be iron, iron-based alloys, aluminium and aluminium-based alloys.

4. The particle separating system according to claim 1, wherein the particle separator comprises a first separating stage for separating particles and, downstream of the first separating stage, a second separating stage for separating particles, and wherein at least the first separating stage and optionally also the second separating stage is arranged upstream of the cam shaft phase adjuster or upstream of the control valve in the flow direction of the engine lubricating oil.

5. The particle separating system according to claim 4, wherein the second separating stage is configured to separate smaller particles than the first separating stage.

6. The particle separating system according to claim 4, wherein the second separating stage, comprises a filter structure, and the filter structure comprises a filter medium, which the engine lubricating oil can flow through, for trapping particles contained in the engine lubricating oil, wherein the filter medium can in particular be pleated.

7. The particle separating system according to claim 6, wherein the filter medium surrounds a longitudinal axis of the filter structure, for example over a circumferential angle of 360°, and is cylindrical or widens, for example conically, in the longitudinal direction of the filter.

8. The particle separating system according to claim 6, wherein
   the engine lubricating oil can be fed to the cam shaft phase adjuster through a hollow space which is delineated by one or more bodies,
   and wherein:
   a flow channelling device is provided which imbues the engine lubricating oil with a rotational impulse about a longitudinal axis which is central in relation to the hollow space as it flows into the hollow space and/or as it flows through the hollow space, and/or
   a body which delineates the hollow space is a rotary body which rotates about a longitudinal axis which is central in relation to the hollow space when the cam shaft phase adjuster is in operation.

9. The particle separating system according to claim 8, wherein filter structure is arranged in the hollow space.

10. The particle separating system according to claim 8, the first separating stage, comprises a centrifugal force separator, which extends around the central longitudinal axis in the hollow space, for absorbing and trapping particles which enter the centrifugal force separator due to centrifugal force.

11. The particle separating system according to claim 10, wherein the centrifugal force separator lines a circumferential wall surrounding the hollow space on the radially outer side and/or forms absorbing pockets for particles with the circumferential wall, and/or the circumferential wall comprises a structured surface (81) for trapping particles.

12. The particle separating system according to claim 10, wherein the centrifugal force separator exhibits an axial length of at least 20 cm or at least 30 cm or at least 40 cm.

13. The particle separating system according to claim 8, wherein the flow channelling device comprises an inlet of the hollow space, and the inlet is embodied such that the engine lubricating oil flows into the hollow space with a directional component which is tangential in relation to the central longitudinal axis.

14. The particle separating system according to claim 8, wherein the flow channelling device comprises one or more deflecting structures in the hollow space which deflect/s the engine lubricating oil in the hollow space in a direction which is tangential with respect to the central longitudinal axis.

15. The particle separating system according to claim 8, wherein the hollow space extends in the stator near an outer circumference of the stator, and the rotational axis of the stator forms the longitudinal axis which is central in relation to the hollow space.

16. The particle separating system according to claim 1, wherein the particle separator comprises a cyclone separator, and the cyclone separator comprises: a vortex portion exhibiting a cyclone axis and comprising an inlet for an inflow of the engine lubricating oil with a tangential directional component with respect to the cyclone axis; an axial separating portion, connected to the vortex portion, for absorbing particles flowing axially in the vortex portion towards the separating portion; and an outlet for the lubricating oil.

17. The particle separating system according to claim 16, wherein a pressure storage for the lubricating oil, which is arranged upstream of the cam shaft phase adjuster, forms the cyclone separator.

18. The particle separating system according to claim 1, wherein:

the engine lubricating oil can be fed to the cam shaft phase adjuster through a hollow space which extends around a rotational axis and is delineated on the radially inner side by a first body and on the radially outer side by a second body which surrounds the first body;

at least one of the bodies can be rotary-driven about the rotational axis absolutely and relative to the other body;

the hollow space forms and/or contains a centrifugal force separator for absorbing particles entering the centrifugal force separator due to centrifugal force;

and an annular gap remains between the first body and the second body downstream of the centrifugal force separator, wherein the annular gap extends around the rotational axis and delineates the hollow space, and the lubricating oil has to flow through the annular gap on its way to the cam shaft phase adjuster.

19. The particle separating system according to claim 1, wherein the particle separator comprises magnetic material for trapping ferritic particles.

* * * * *